United States Patent
Carus et al.

(10) Patent No.: US 10,229,118 B2
(45) Date of Patent: *Mar. 12, 2019

(54) APPARATUS, SYSTEM AND METHOD FOR A SEMANTIC EDITOR AND SEARCH ENGINE

(71) Applicant: Information Extraction Systems, Inc., Waban, MA (US)

(72) Inventors: Alwin B. Carus, Waban, MA (US); Thomas J. DePlonty, Melrose, MA (US)

(73) Assignee: Information Extraction Systems, Inc., Waban, MA (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/252,490

(22) Filed: Aug. 31, 2016

(65) Prior Publication Data

US 2016/0371263 A1 Dec. 22, 2016

Related U.S. Application Data

(63) Continuation of application No. 14/325,636, filed on Jul. 8, 2014, now Pat. No. 9,460,211.
(Continued)

(51) Int. Cl.
*G06F 17/30* (2006.01)

(52) U.S. Cl.
CPC .... *G06F 17/30011* (2013.01); *G06F 17/3053* (2013.01); *G06F 17/30713* (2013.01); *G06F 17/30734* (2013.01); *G06F 17/30864* (2013.01)

(58) Field of Classification Search
CPC ......... G06F 17/30864; G06F 17/30011; G06F 17/30734; G06F 17/3053; G06F 17/30713
See application file for complete search history.

(56) References Cited

U.S. PATENT DOCUMENTS

| | | | | |
|---|---|---|---|---|
| 5,724,571 | A | * | 3/1998 | Woods .............. G06F 17/30011 |
| 6,026,388 | A | * | 2/2000 | Liddy .............. G06F 17/30654 |

(Continued)

OTHER PUBLICATIONS

QasemiZadeh, B., et al. "Random Positive-Only Projections: PPMI-Enabled Incremental Semantic Space Construction." Proceedings of the Fifth Joint Conference on Lexical and Computational Semantics (*SEM 2016) (2016):189-198.
(Continued)

*Primary Examiner* — Leslie Wong
(74) *Attorney, Agent, or Firm* — Schmeiser, Olsen & Watts, LLP; Anthony L. Meola

(57) ABSTRACT

We describe here a system and method for creating, maintaining and using a semantic search engine environment for precise retrieval of curated answers to questions where the answers may be drawn from an authoritative document collection. The invention combines processing by human developers and software: semantic editing tools for creating, storing, maintaining queries and variants of queries, and query and document passage categories; links from queries to text passages that provide answers to these queries; a document retrieval store; means for matching user queries against stored queries; means for creating, storing, maintaining, and retrieving semantic and management metadata and categories about queries and documents and using these data for navigating the document collection; and means for finding information related to the user's information need by text and semantic similarity retrieval.

20 Claims, 19 Drawing Sheets

Related U.S. Application Data

(60) Provisional application No. 61/843,492, filed on Jul. 8, 2013.

(56) References Cited

U.S. PATENT DOCUMENTS

| | | | | |
|---|---|---|---|---|
| 6,675,159 | B1* | 1/2004 | Lin | G06F 17/2705 |
| 9,135,561 | B2* | 9/2015 | Vadlamani | G06N 5/022 |
| 9,245,227 | B2* | 1/2016 | Tabrizi | G06F 17/30 |
| 9,262,528 | B2* | 2/2016 | Cooper | G06F 17/275 |
| 9,460,211 | B2* | 10/2016 | Carus | G06F 17/3053 |
| 9,563,656 | B2* | 2/2017 | Castellani | G06F 17/30389 |
| 2002/0180771 | A1* | 12/2002 | Lin | A63F 13/12 715/700 |
| 2006/0078862 | A1* | 4/2006 | Goto | G09B 7/02 434/322 |
| 2007/0005566 | A1* | 1/2007 | Bobick | G06N 5/022 |
| 2007/0055656 | A1* | 3/2007 | Tunstall-Pedoe | G06F 17/30654 |
| 2007/0078803 | A1* | 4/2007 | Gilmour | G06F 17/30864 |
| 2007/0203996 | A1* | 8/2007 | Davitz | H04L 51/32 709/206 |
| 2008/0027933 | A1* | 1/2008 | Hussam | G06F 17/30696 |
| 2009/0070322 | A1* | 3/2009 | Salvetti | G06F 17/30616 |
| 2009/0192968 | A1* | 7/2009 | Tunstall-Pedoe | G06N 5/02 706/47 |
| 2009/0248659 | A1* | 10/2009 | McCool | G06F 17/30654 |
| 2009/0288150 | A1* | 11/2009 | Toomim | G06F 21/6218 726/5 |
| 2009/0292687 | A1* | 11/2009 | Fan | G06F 17/30654 |
| 2010/0030734 | A1* | 2/2010 | Chunilal | G06F 17/30867 707/770 |
| 2010/0161628 | A1* | 6/2010 | Bookman | G06F 17/3061 707/755 |
| 2011/0106617 | A1* | 5/2011 | Cooper | G06Q 30/02 705/14.49 |
| 2011/0208822 | A1* | 8/2011 | Rathod | G06Q 30/02 709/206 |
| 2011/0314032 | A1* | 12/2011 | Bennett | G06F 17/30684 707/749 |
| 2011/0320187 | A1* | 12/2011 | Motik | G06F 17/278 704/9 |
| 2012/0060106 | A1* | 3/2012 | Moxley | G06F 17/30861 715/758 |
| 2012/0150861 | A1* | 6/2012 | Thione | G06F 17/30991 707/741 |
| 2012/0185484 | A1* | 7/2012 | Jones | G06Q 10/101 707/740 |
| 2012/0272164 | A1* | 10/2012 | Polonsky | G06Q 10/10 715/753 |
| 2012/0303356 | A1* | 11/2012 | Boyle | G06F 17/30672 704/9 |
| 2013/0041921 | A1* | 2/2013 | Cooper | G06F 17/30672 707/780 |
| 2013/0073387 | A1* | 3/2013 | Heath | G06Q 30/02 705/14.53 |
| 2013/0246327 | A1* | 9/2013 | Tabrizi | G06N 5/022 706/50 |
| 2013/0311903 | A1* | 11/2013 | Zadeh | G06F 3/0482 715/753 |
| 2014/0171133 | A1* | 6/2014 | Stuttle | G06F 17/3087 455/466 |
| 2014/0280087 | A1* | 9/2014 | Isensee | G06F 17/30477 707/723 |
| 2014/0298199 | A1* | 10/2014 | Johnson, Jr. | H04L 65/403 715/753 |

OTHER PUBLICATIONS

Sahlgren, M. (2005): An Introduction to Random Indexing. Proceedings of the Methods and Applications of Semantic Indexing Workshop at the 7th International Conference on Terminology and Knowledge Engineering, TKE Aug. 16, 2005, Copenhagen, Denmark.

Pedersen, Ted. (2010). Computational Approaches to Measuring the Similarity of Short Contexts : A Review of Applications and Methods. University of Minnesota Supercomputing Institute. Retrieved from the University of Minnesota Digital Conservancy, http://purl.umn.edu/151596.

G. Recchia, M. Jones, M. Sahlgren, P. Kanerva. 2010. "Encoding sequential information in vector space models of semantics: Comparing holographic reduced representation and random permutation." pp. 865-870.

Bullinaria, John A., and Joseph P. Levy. Extracting Semantic Representations from Word Co-occurrence Statistics: A Computational Study. Behavior Research Methods 39.3 (2007): 510-526.

O. Levy, Y. Goldberg, I. Dagan. 2015. "Improving Distributional Similarity with Lessons Learned from Word Embeddings". Transactions of the Association for Computational Linguistics Mar. 2015, pp. 211-225.

Pedersen, Ted. Information Content Measures of Semantic Similarity Perform Better Without Sense-Tagged Text. HLT 10 Human Language Technologies: The 2010 Annual Conference of the North American Chapter of the Association for Computational Linguistic (2010): pp. 329-332.

Levy, Omer and Yoav Goldberg. Linguistic Regularities in Sparse and Explicit Word Representations. Semantic Similarity, Word Embeddings (2014): n. pag.

Sahlgren M, Holst A, Kanerva P. "Permutations as a means to encode order in word space". Proceedings of the 30th Annual Meeting of the Cognitive Science Society (CogSci'08); Jul. 23-26; Washington DC, USA. 2008.

S. Jimenez, A. Gelbukh. 2011. "SC Spectra: A Linear-Time Soft Cardinality Approximation for Text Comparison". In Advances in Soft Computing, Lecture Notes in Computer Science vol. 7095, 2011, pp. 213-224.

Y. Liu, B. McInnes, T. Pedersen, G. Melton-Meaux, S. Pakhomov. 2012. "Semantic Relatedness Study Using Second Order Co-occurrence Vectors Computed from Biomedical Corporation, UMLS and WordNet". IHI '12, Proceedings of the 2nd ACM SIGHIT International Health Informatics Symposium, Miami, Florida, pp. 363-371.

Han, Lushan, Abhay L. Kashyap, Tim Finin, James Mayfield, and Johnathan Weese. "UMBC_EBIQUITY-CORE: Semantic Textual Similarity Systems." Proceedings of the Second Joint Conference on Lexical and Computational Semantics. N.p.: n.p., n.d. N. Pag.

S. Patwardhan and T. Pedersen. Using WordNet-based Context Vectors to Estimate the Semantic Relatedness of Concepts. In Proceedings of the EACL 2006 Workshop on Making Sense of Sense: Bringing Computational Linguistics and Psycholinguistics Together, pp. 1-8, Trento, Italy, Apr. 2006.

Sahlgren, Magnus. "A Brief History of Word Embeddings (and Some Clarifications)." Web blog post. Gavagai. N.p., Sep. 30, 2015. Web. Dec. 8, 2015.

"Question Answering." Wikipedia, the Free Encyclopedia. Wikimedia Foundation, Nov. 19, 2015. Web. Dec. 8, 2015.

"Random indexing." Wikipedia, the Free Encyclopedia. Wikimedia Foundation, Sep. 30, 2015. Web. Dec. 8, 2015.

"Semantic Similarity." Wikipedia, the Free Encyclopedia. Wikimedia Foundation, Oct. 10, 2015. Web. Dec. 8, 2015.

S. Banerjee, T. Pedersen. 2003. "Extended gloss overlaps as a measure of semantic relatedness". In Proceedings of the Eighteenth International Joint Conference on Artificial Intelligence, Acapulco, pp. 805-810.

"Question Answering", Wikipedia (https://en.wikipedia.org/wiki/Question_answering). This page was last edited on Apr. 30, 2017, at 00:14.

"Random Indexing", Wikipedia (https://en.wikipedia.org/wiki/Random_indexing).This page was last edited on Dec. 18, 2016, at 10:59.

"Semantic Similarity", Wikipedia (https://en.wikipedia.org/wiki/Semantic_similarity).This page was last edited on May 2, 2017, at 07:37.

(56) References Cited

OTHER PUBLICATIONS

G. Recchia, M. Jones, M. Sahlgren, P. Kanerva. 2010. "Encoding sequential information in semantic space models: comparing holographic reduced representation and random permutation." Computational Intelligence and Neuroscience (2015): pp. 1-19.

Widdows, Dominic, et al. "Reasoning with vectors: A continuous model for fast robust inference." Logic Journal of the IGPL (2015) 23 (2): 141-173.

Cohen, Trevor, et al. "Predication-based Semantic Indexing: Permutations as a Means to Encode Predications in Semantic Space." Proceedings of the AMIA 2009 Annual Symposium (2009): 114-118.

Levy, Simon, et al. "Vector Symbolic Architectures: A New Building Material for Artificial General Intelligence." Frontiers in Artificial Intelligence and Applications (2008) 171(1): 414-418.

* cited by examiner

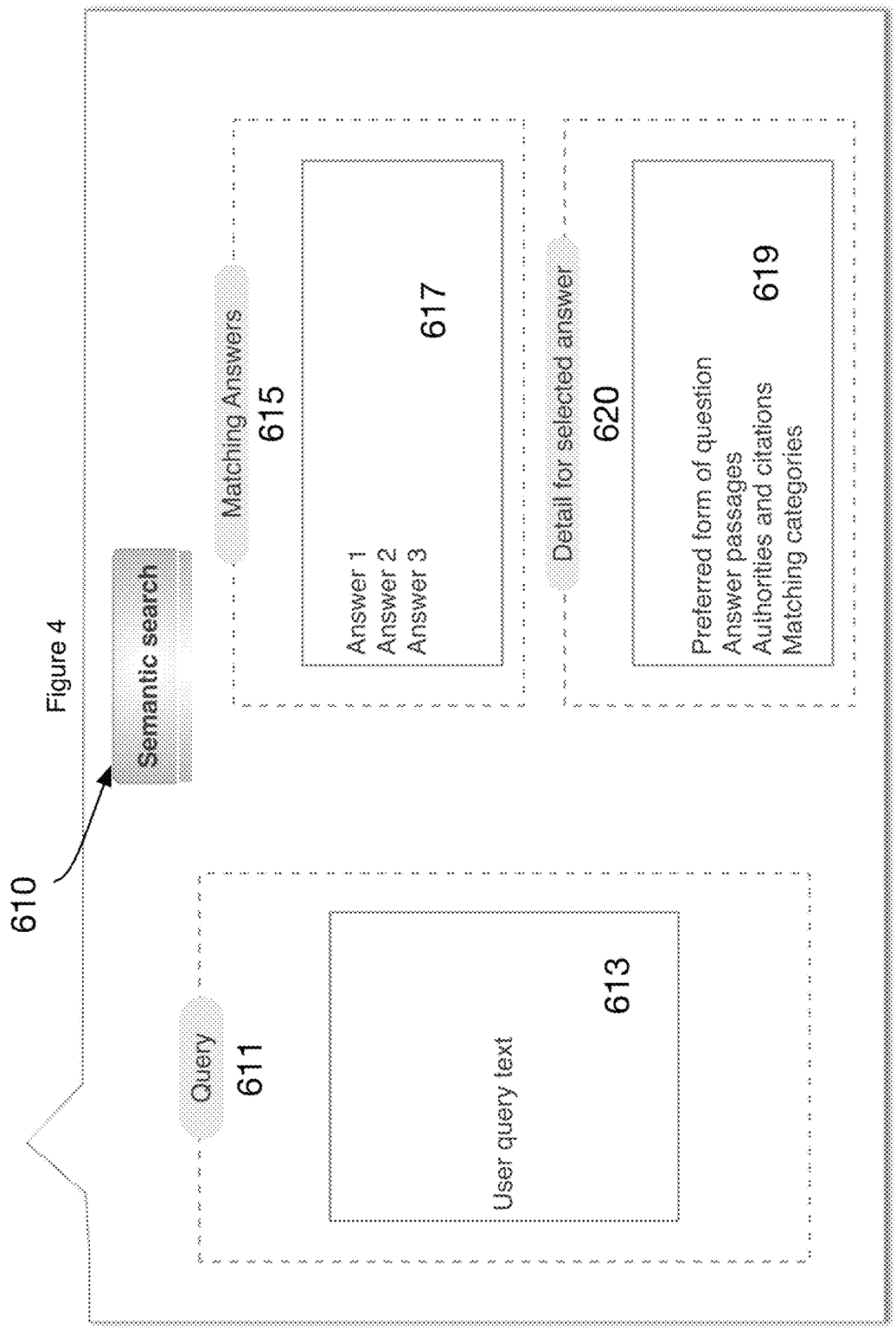

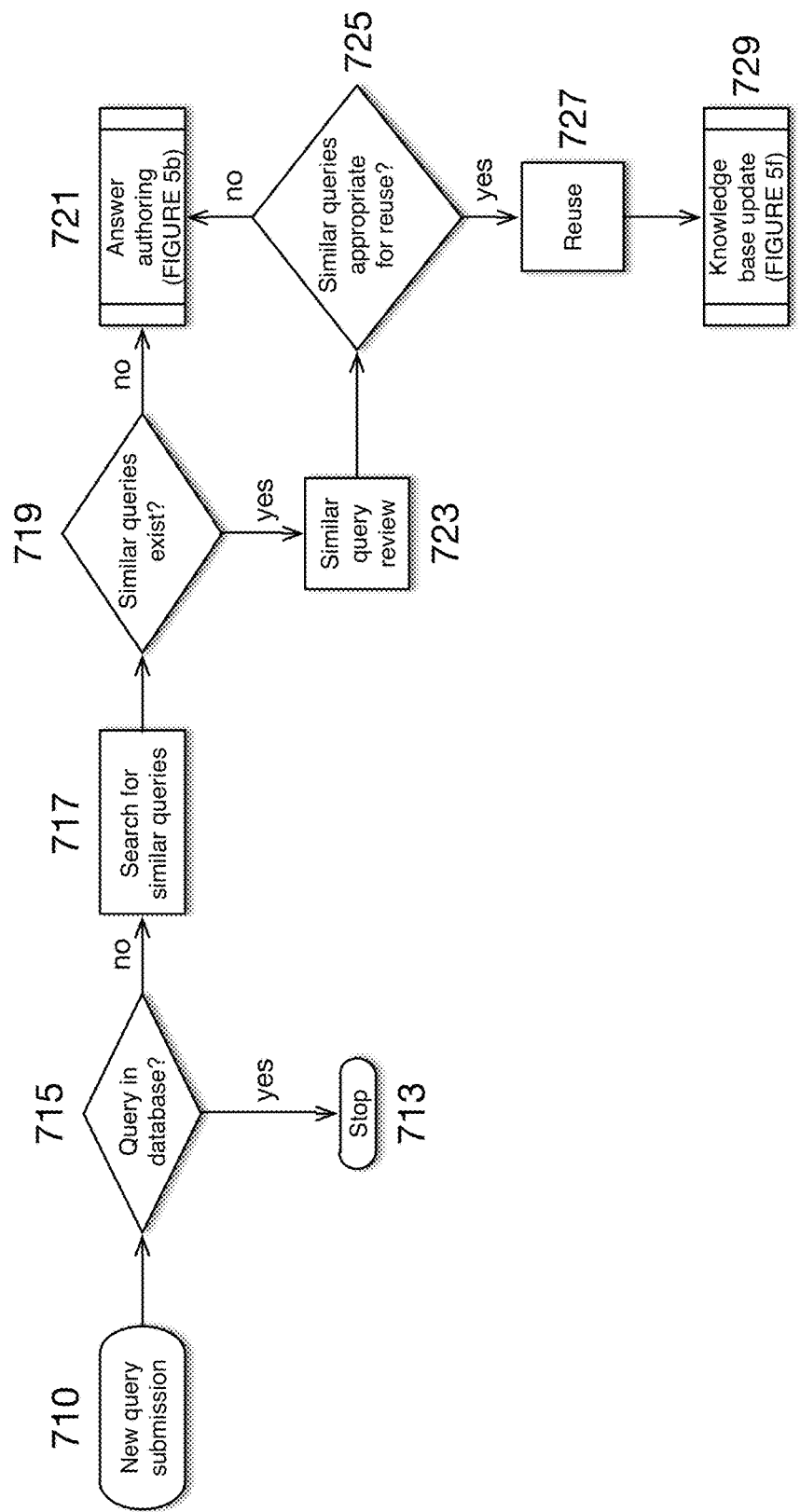
Figure 5a: new query submission, reuse of existing answers

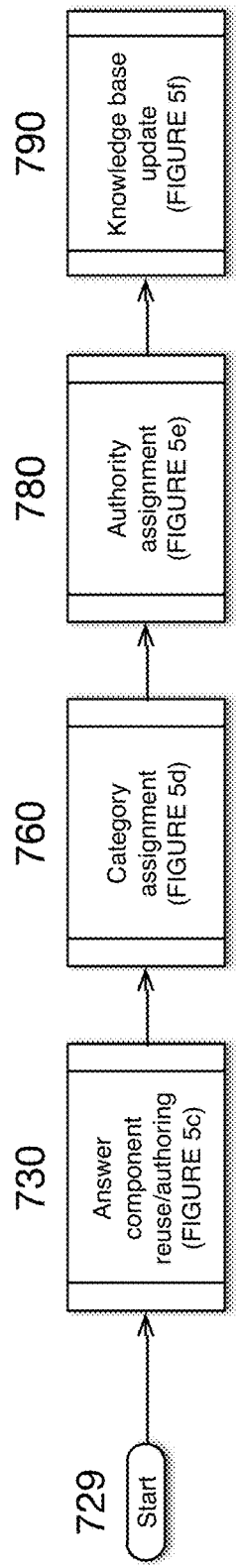
Figure 5b: answer authoring

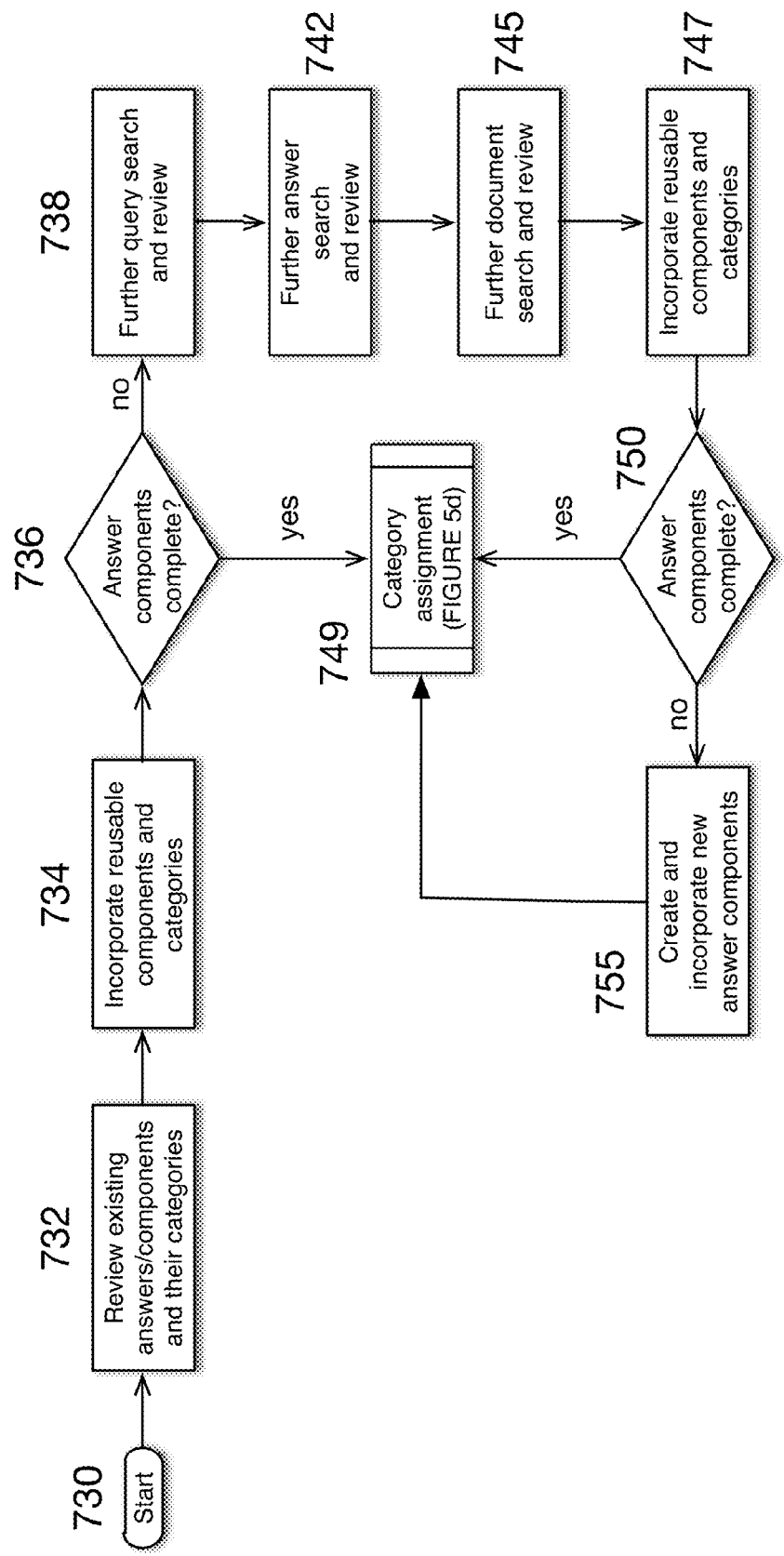
Figure 5c: Answer component reuse and authoring

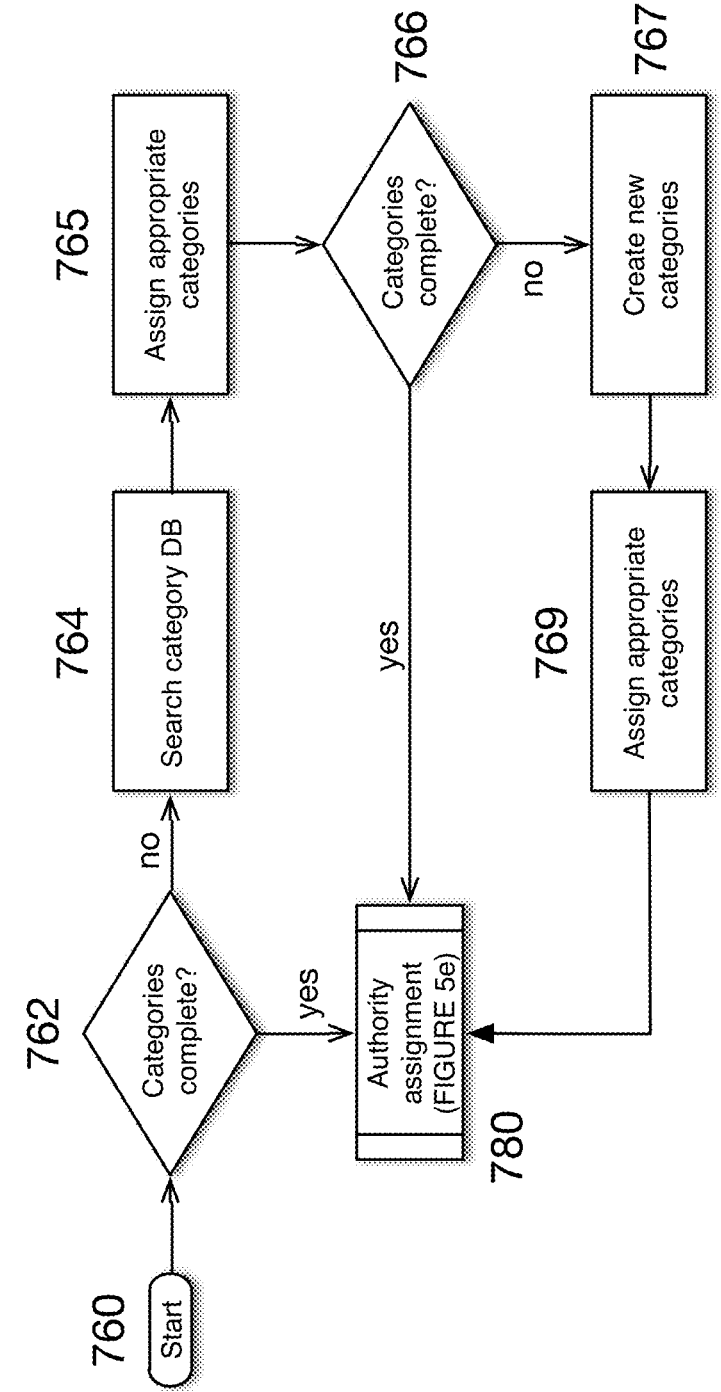

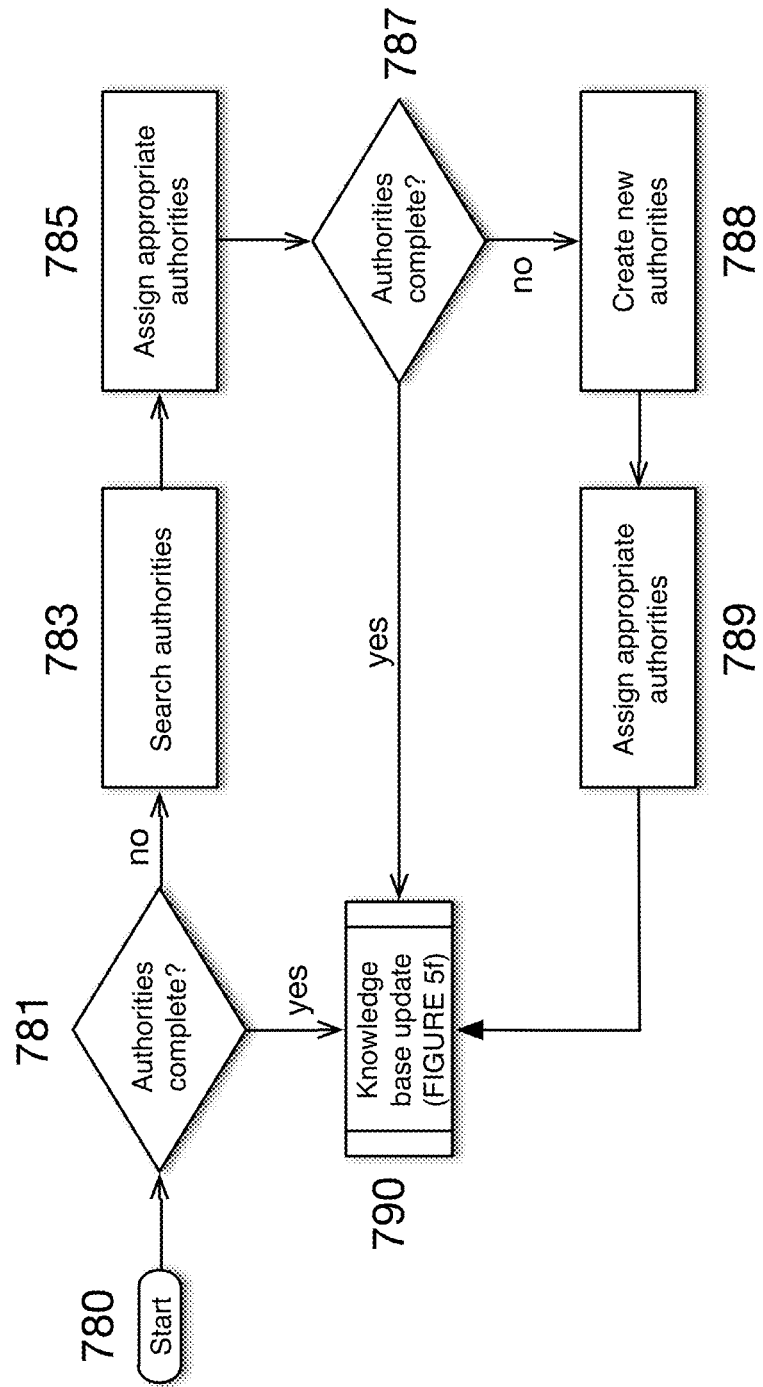

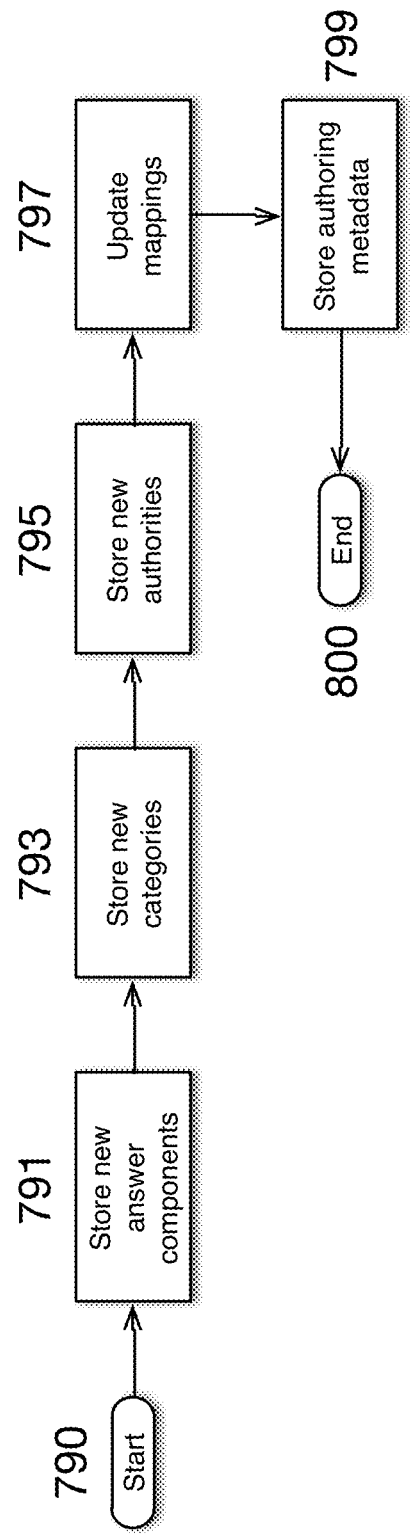
Figure 5f: knowledge base update

APPARATUS, SYSTEM AND METHOD FOR A SEMANTIC EDITOR AND SEARCH ENGINE

The present application relates to an takes priority from co-pending U.S. non-provisional application serial no. 14/325,636 filed on Jul. 8, 2014, issued on Oct. 4, 2016 as U.S. Pat. No. 9,640,211 and entitled "AN APPARATUS, SYSTEM AND METHOD FOR A SEMANTIC EDITOR AND SEARCH ENGINE", which claims benefit of provisional Application No. 61/843,492 filed on Jul. 8, 2013, which applications and U.S. patent are hereby incorporated by reference in their entirety.

BACKGROUND

1. The Field of the Present Invention

The present invention relates generally to an apparatus, system and method for semantic editing and search engine.

2. General Background

Traditional keyword-based information retrieval ("search engine") applications are widely used for retrieving documents in large document collections. Information retrieval applications create indexes that record the terms that occur in the documents. Sometimes additional metadata such as the locations of these terms in the document and document categories can also be stored with documents. Information retrieval applications then match user query terms against these indexes and rank the resulting matches to provide a list of documents that best match the user's query.

The resulting set of documents may also be filtered or ranked based on additional criteria such as the categories or term location. Further refinements to query analysis, for instance, determining what kind of information the user's query is about, can be used to filter or rank retrieval results; or even identify a passage that is most relevant to the user's information need. For example, a linguistic pattern underlying of the query "when was Lincoln assassinated" could be matched against the text of an article on Abraham Lincoln that states that "Lincoln was assassinated on Apr. 14, 1865". Various linguistic enhancements to information retrieval, commonly described as "question answering" technologies (see the Wikipedia article, http://en.wikipedia.org/wiki/Question_answering, for more details), have been developed. These systems typically analyze the structure and content of queries and retrieve the best matching results in a data store of similarly structured data. This data store may be a repository of organized facts or structured data extracted from document collections using the same techniques as used to analyze the queries (or even a combination of both).

Information retrieval and related question answering technologies are sometimes used to find information for customer or technical support knowledge bases, especially if these data are constructed as documents. Alternatively, uncomplicated, specialized answer-specific knowledge bases are sometimes created specifically to deal with answering import user questions (such as "frequently asked questions" or "FAQs").

These natural language processing ("NLP") and FAQ-based approaches to finding information in answer-specific knowledge bases have well-understood weaknesses. Information retrieval approaches allow the user to find documents, but their answers often imprecise. If a frequent word is used in a query, too many documents are returned. Sometimes no answer is returned at all. If a term not found in the document collection is used, no relevant documents may be found. Finally, if a term is ambiguous irrelevant documents may be returned.

Question-answering systems use complex and not entirely reliable NLP techniques. These techniques do not always extract relevant or useful data from document collections; and do not always correctly analyze queries. These techniques require considerable specialist expertise to develop; are computationally demanding; and all the same remain fragile, unreliable, and very difficult to tune or adapt.

FAQs are a simple approach to supplying authoritative answers to users' questions. They can often provide precise answers to user questions, however, typically FAQs are searched as if they were just documents. In other words, the FAQ-based approach is often just information retrieval performed against written text organized around a relatively small number of user questions.

However, the most significant weakness of all these approaches is their lack of feedback: the queries users make and the answers to these queries are not exploited or stored for future use. For instance, if a user's query does not match the terminology in the document base and nothing useful is retrieved, there is no recourse in these approaches. There is no mediating agent to interpret the query, identify answers for the query, and record these for future use.

This is all the more remarkable since it is well-recognized in information retrieval and question answering that many identical (or essentially identical) queries are submitted repeatedly. Moreover, the distribution of queries is Zipfian. (A Zipfian distribution is a highly skewed distribution with a small number of very frequent queries that account for much of the frequency mass of all queries; and a very large number of infrequent queries.) Each common query (and its synonymic or near synonymic variants) has associated answers and semantic categories. Being able to record and reuse these queries, answers and categories in a semantic search engine means that queries can be answered consistently with the very best answers. Since the most frequent queries appear very soon, the vast majority of queries are dealt with quickly. In short order, the knowledge work shifts to handling infrequent and more complicated queries that are not handled well by automation.

These frequency considerations apply also to user queries in customer and technical support knowledge bases. The described mapping of queries and their variants to answers is highly desirable here because customer and technical support personnel need to have at their fingertips the most appropriate, timely and up-to-date responses to users' questions.

SUMMARY OF THE INVENTION

We have discovered an apparatus, system and method for semantic editing and search engine. The semantic search engine according to the present invention exploits a Zipfian distribution of queries in two ways:

first, it is possible to "bootstrap" a semantic search engine with only a very small knowledge base of high-frequency queries and their answers to make the search engine usable; and second, since fewer and fewer novel queries by frequency arrive over time, the effort required to provide high coverage for the universe of possible queries drops over time.

As a result this Zipfian distribution makes the use of human developers practical. This is especially true in contexts in which a human would normally be used such as in customer or technical support. Within a short time, most user queries will have been captured and automated responses will be available for them. This increases productivity and consistency significantly. Furthermore, it benefits training new or inexperienced staff: it becomes much easier to train new customer or technical support staff because—after initial search engine bootstrapping and an initial period of use—answers for most questions will have already been created.

The semantic search engine according to the present invention can be characterized as "tunable." The term "tunable" refers to the fact that the knowledge base of the semantic search engine is created and expanded based on the specific queries that are submitted to it by users. The distribution of these queries ensures that a bootstrapped knowledge base can be created quickly; and that the most frequent additional queries are quickly encountered and taken into account. The semantic search system, in other words, expands by taking advantage of the statistical structure of users queries and quickly organizes itself around them. A different domain or a different audience for the same data results in different user queries, with different answers and categories, and with different frequencies. However, the semantic search engine needs specialized semantic editing tools to create this knowledge base efficiently and accurately.

As a consequence, the tunable semantic search engine performs highly favorably compared to commercial question-answering systems. The tunable semantic search system is particularly advantageous for sites that:

would like to have the ability to tightly control the kinds of questions and answers incorporated into their systems;

would like to minimize the computing resources (storage, memory and processing power) needed to run their systems;

would like to provide immediate responses to highly specific questions;

would like to deploy a question-answering system quickly with minimal effort, staff, resources and cost;

would like to reduce their dependency on sophisticated development resources or developers to develop the semantic search engine knowledge base; and would like to have the ability to create queries, categories and responses in multiple languages (internationalization).

In first embodiment, the present invention includes an apparatus or computer system for conducting semantic editing, the computer system having a readable and accessible storage medium, at least one processor and a user interface all interconnected, where the computer system includes a query semantic management module having computer software with instructions to perform the following steps: finding a closest matching query to at least one input given query among a store of queries; determining whether the at least one given query is defined as at least one of the following: substantially similar to a query existing in the store or is a novel query; creating a set of canonical forms for the novel query; attaching a plurality of categories to at least one of the novel query and the store of queries; organizing the plurality of categories into a first set of ontologies with at least one semantic relationship between each of the plurality of categories; organizing at least one of the novel query and the store of queries into a second set of ontologies with at least one semantic relationship between the at least one of the novel query and the store of queries; attaching at least one answer to at least one of the novel query and the store of queries; attaching editorial metadata to at least one of the novel query and the store of queries; and creating a document database having one or more documents with associated metadata.

The apparatus or computer system, according to one embodiment of the present invention also includes a knowledge base module having computer software with instructions to perform the following steps; storing the first and second set of ontologies, an authority database and the document database; storing at least one mapping between at least one of the following: a given query and an answer; a given query and a category; an answer and a category; an answer and an authority; and a document and a category; storing editorial metadata for information contained in at least one of the first and second set of ontologies, an authority database and the document database; and storing document management metadata for the documents in the document database.

The apparatus or computer system, according to one embodiment of the present invention also includes a semantic search module having computer software with instructions to perform the following steps: inputting at least one input item comprising of at least one of a natural language text having at least one word; or at least one element of metadata for at least one of the following: queries, answers, categories, authorities, citations, and documents; searching the knowledge base module for matches of given queries, answers and associated metadata based upon a predetermined matching scale; and reporting the matches ranked according to the predetermine matching scale.

In some embodiments there includes finding a matching query to the given query among a store of queries using at least one similarity algorithm, where the algorithm is a text similarity algorithm, or where the algorithm is a semantic similarity algorithm.

In some embodiments a substantially similar is defined as an equivalent query or a reusable query.

In some embodiments a novel query is defined and includes unrelated queries.

In some embodiments attaching at least one answer includes at least one of the following steps: creating a new answer with or without reference to at least one existing document; or reusing at least one answer for at least one stored query.

In some embodiments the reusing step includes editing the at least one answer for the least one stored query.

In some embodiments there is a step of retrieving existing mappings of stored queries to selected document passages, and step of searching for document passages that match the given query.

In some embodiments there is a step of highlighting and attaching document passages to the given query and a step of attaching categories to documents, document sections and document passages.

Some embodiments include the step of supplying at least one authority to the answers of the given query.

Some embodiments includes a step of reusing the at least one authority to answers for the given query if it is found in the knowledge base module.

In some embodiments, an authority is created if it does not exist in the knowledge base module.

Some embodiments include a step of supplying at least one citation to answers of the given query.

Some embodiments include the step of reusing the at least one citation to answers of the given query if it is found in the knowledge base module.

In some embodiments a citation is created if it does not exist in the knowledge base module.

In some embodiments editorial metadata includes at least one of author, date, status, and editorial note.

In some embodiments the predetermined matching scale is defined as a combination of at least one of a plurality of text and semantic similarity algorithms.

Some embodiments include the step of creating an appropriate category if said category does not already exist.

The semantic search engine adjusts to the information needs of users through modifications of the semantic search engine's knowledge base driven by novel queries offered by users and by user feedback to answers of queries. This feedback is processed by one or more developers using the semantic editor to construct a knowledge base of authoritative, curated answers and other related semantic information. The semantic search engine knowledge base may be curated by a developer working either on-line (interactively, as questions or queries are submitted dynamically to the semantic search engine) or in the background (in a back-office setting, processing queries singly or in batch). This flexible approach makes it possible to bootstrap knowledge bases, starting with only a small, seed knowledge base, and efficiently develop a rich knowledge base tuned to the needs of its users. The invention is distinguished by its simplicity; economy of development, processing and storage; and its ability to quickly and accurately adjust to the information needs and requirements of its users.

Automation of some aspects of the developer's work is also possible within this semantic search framework. For example, question answering technology could be used to propose answer candidates; likewise text classification software could be used to categorize questions and answers. These additions, however, should be seen as refinements to or extensions of a system based on human developers rather than an automated system with human developers dealing with problems that automation cannot handle correctly or effectively.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIG. 4 shows a detailed view of the semantic search component according to one embodiment of the present invention;

FIG. 5a shows a flow diagram for a new query submission according to one embodiment of the present invention;

FIG. 5b shows a flow diagram for answer authoring according to one embodiment of the present invention;

FIG. 5c shows a flow diagram for answer component reuse and authoring according to one embodiment of the present invention;

FIG. 5d shows a flow diagram for category assignment according to one embodiment of the present invention;

FIG. 5e shows a flow diagram for authority assignment according to one embodiment of the present invention; and FIG. 5f shows a flow diagram for a knowledge base update according to one embodiment of the present invention.

DETAILED DESCRIPTION OF THE PREFERRED EMBODIMENTS

The present disclosure will now be described more fully with reference to the figures in which an embodiment of the present disclosure is shown. The subject matter of this disclosure may, however, be embodied in many different forms and should not be construed as being limited to the embodiments set forth herein.

Exemplary Operating Environment

Figure 1:
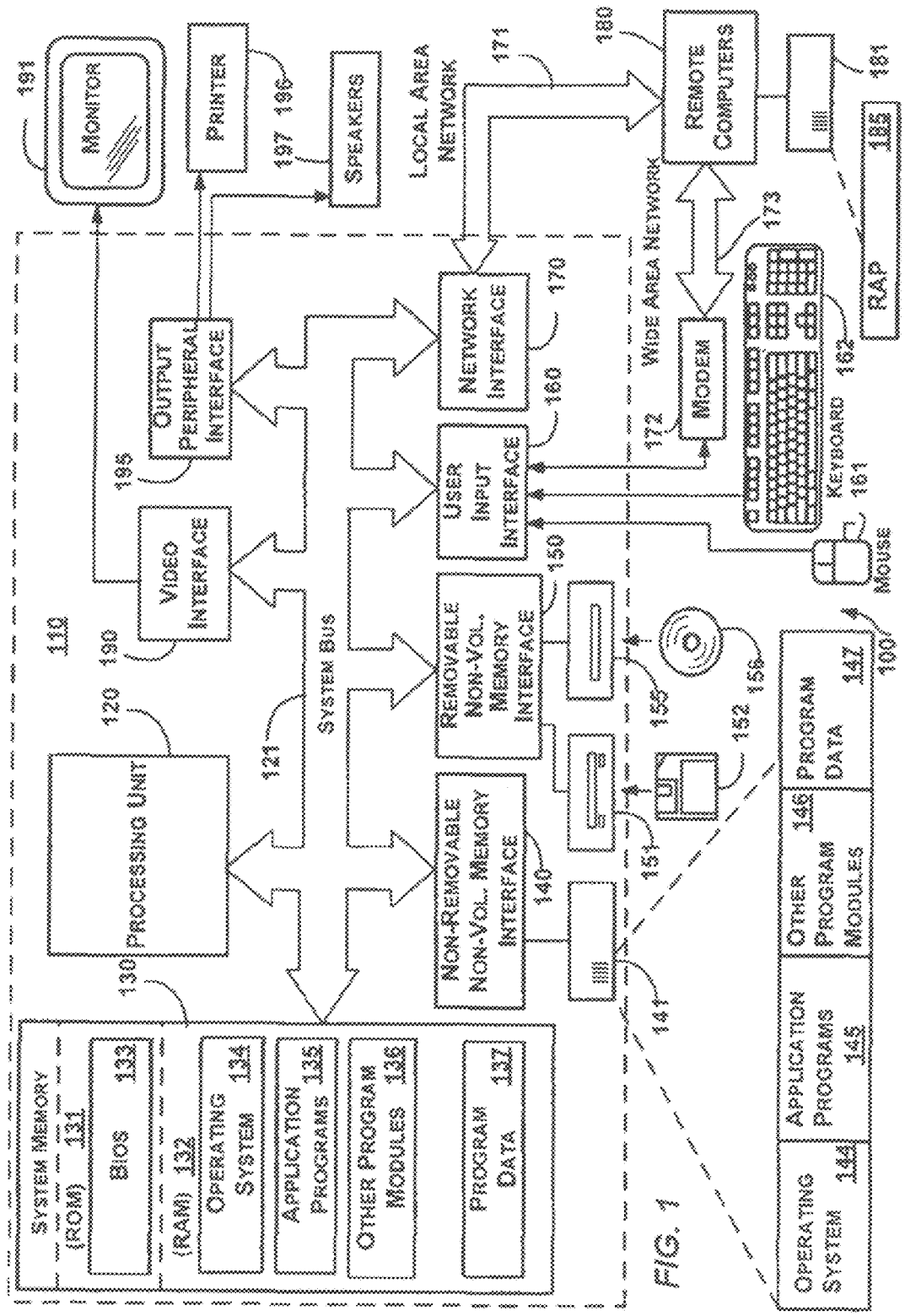
FIG. 1 is a block diagram showing an exemplary computing environment in which aspects of the present invention may be implemented.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well-known computing systems, environments, and/or configurations that may be suitable for use with aspects of the subject matter described herein include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2A:
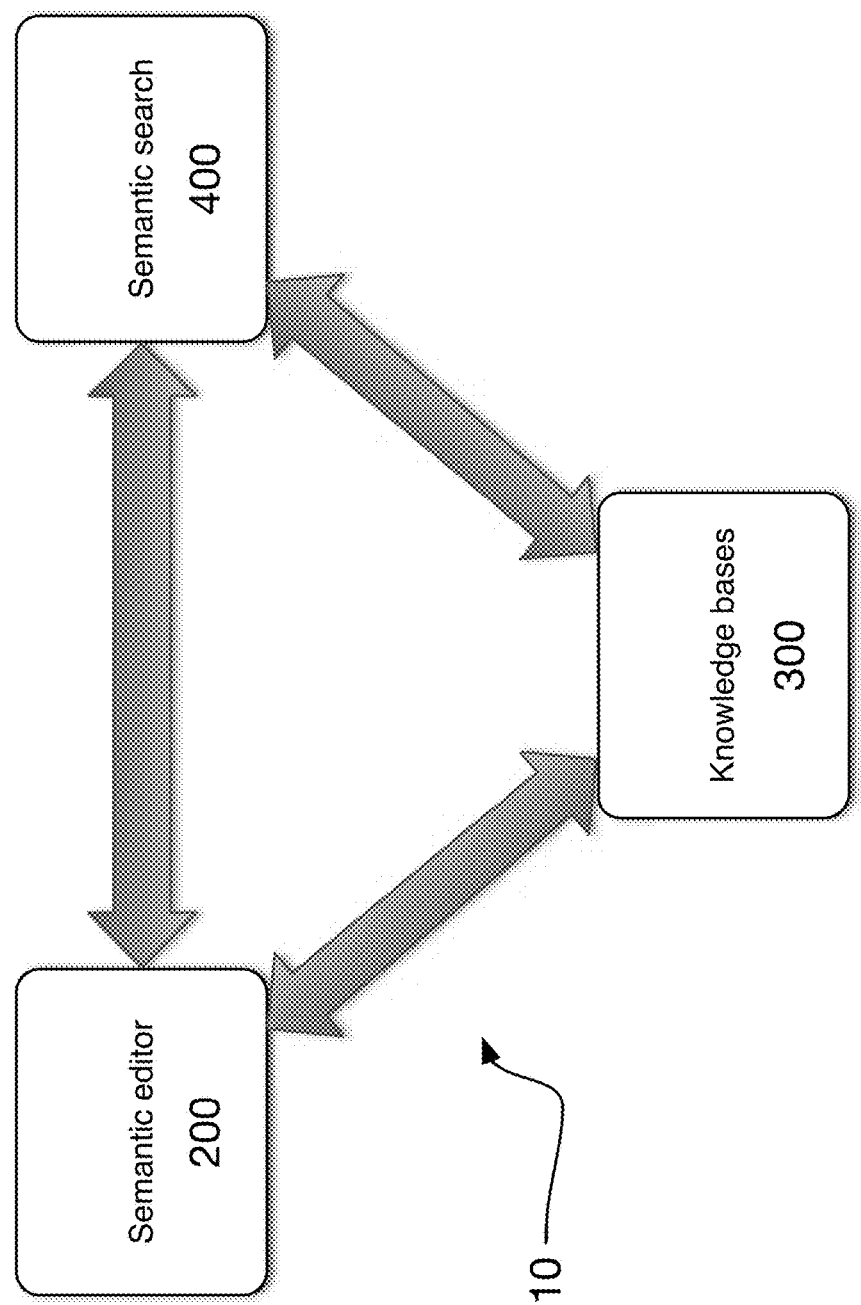
FIG. 2a shows high level logic flow the semantic editor and search engine according to one embodiment of the present invention.

Referring now to FIG. 2a, there is shown modules 200, 300 and 400 according to one embodiment of the present invention 10 which can be implemented with the elements and features as detailed on FIG. 1.

1. The Semantic Editor

The semantic editor 200 which has functions for:
Query 205, which includes:
creating query mappings: match a query to its normative ("canonical") form; and
viewing/editing query ontology: place each normative query in the ontology of all queries;
Category 210, which includes:
creating category mappings: setting categories for queries and answers; and
viewing/editing category ontology: placing each category in ontology of all categories;
Answer 215, which includes:
creating answer mappings: matching a normative query to its possible answers;
looking up documents: searching for a relative document in document collection;
authoring answers: creating answers if no document contains an answer;
editing citation (authority) data: creating citations for answers;
Management, 220 which includes:
managing editorial data: creating editorial metadata for documents, queries, answers, categories and authority; and
managing documents: inputting, indexing and categorizing documents;
Additional functions which include:
creating answer templates; and
indexing and re-using answers.

Figure 2B:
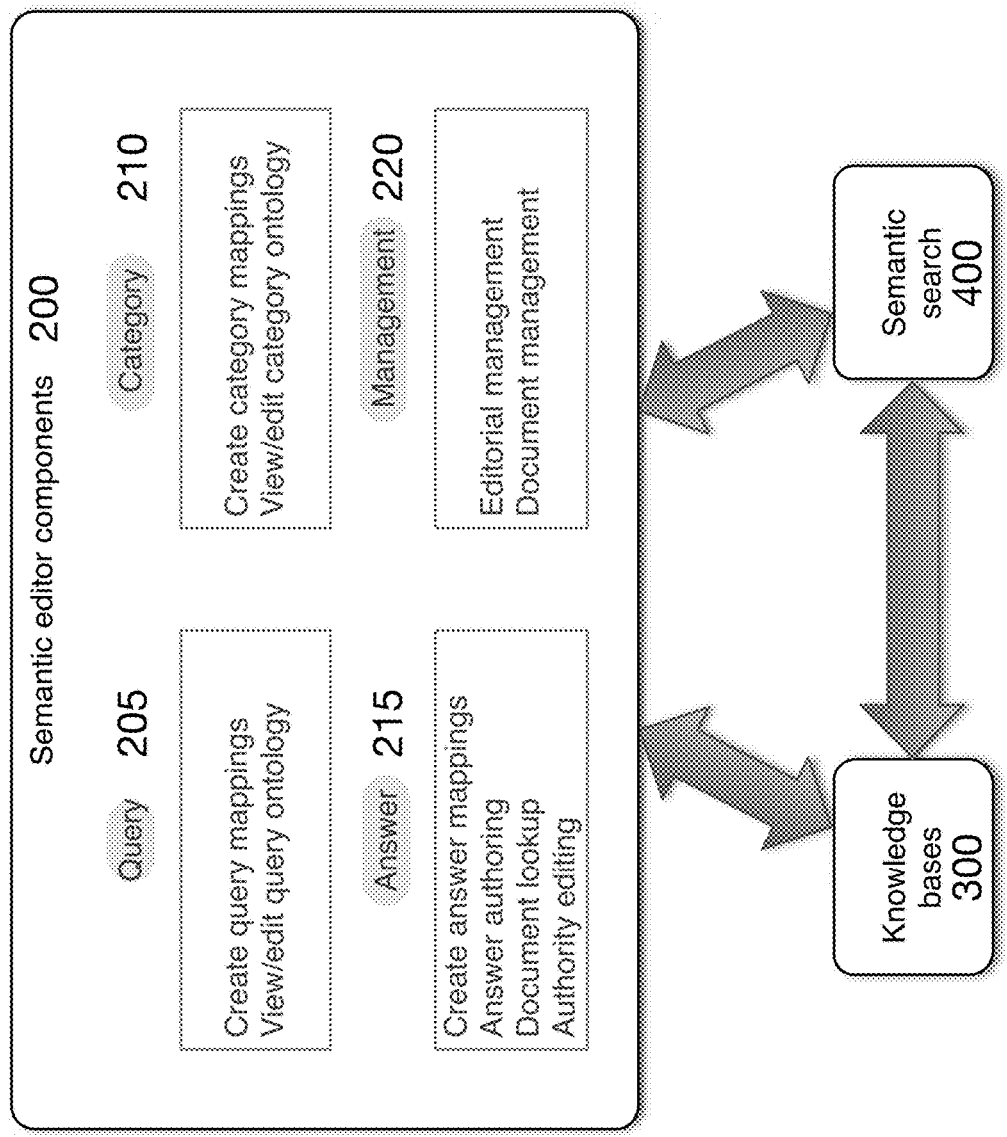
FIG. 2b shows a high level view of the semantic editor components according to one embodiment of the invention.

Referring now to FIG. 2b, there is shown detail of the semantic editor module 200. As part of Queries 205, if questions and their variants are mapped to answers 215 and categories 210; and questions 205 and categories 210 are organized as ontologies; it is necessary to have tools to create, maintain, store, navigate, search and match information. The tool that performs this work is the semantic editor. The semantic editor has the following functions:
query semantic management 220:
a. finding the closest matching query to a given input query among a store of queries using any of many possible text similarity and semantic similarity algorithms and their combinations;
b. determining whether or not a given query is closely similar according to these algorithms to an existing query (and can therefore be considered a synonym or closely semantically related) or is a novel, previously unseen and unrelated query;
c. creating canonical forms of novel queries;
d. attaching categories to queries;
e. organizing categories into ontologies with semantic relations between categories;
f. organizing queries into ontologies with semantic relations between categories;
g. creating document store;
h. searching for document passages that match a query;
i. highlighting and attaching document passages to a given query;
j. attaching categories to documents, document sections and document passages;
k. retrieving existing mappings of queries to selected ("highlighted") document passages;
l. supplying authorities and citations to answers;
m. finding the closest matching answer to a given input answer among a store of answers using many possible text similarity and semantic similarity algorithms and their combinations; and
n. determining whether or not a given answer is closely similar to an existing answer (and therefore can be considered semantically related) or is a novel, previously unseen and unrelated answer.
ontology semantic management:
a. creating links between categories and queries and external information sources (such as products or services).
semantic search:
a. entering text and metadata, in order to find the most closely matching queries, the answers that have been mapped to them, and more detailed information about queries and answers.

2. Document Sets Processed

The semantic editor is platform-independent and web-browser-based with the ability to display and process documents in a wide variety of common file and data formats.

3. Document Store

The document store (see FIG. 3g) is an information retrieval engine (such as Apache Lucene or Solr) capable of indexing Unicode text; incorporating document metadata such as document section, categories and location; and providing the ability to rank and/or filter retrieved documents using both terms and metadata. A Unicode document store has the ability to input documents in multiple languages.

The types of document collections handled by the semantic search engine are those typically handled by enterprise search engines (departmental or corporate document collections) as well as customer and technical support applications (FAQs, wikis, web sites, structured and semi-structured documents). The document store will have the ability to incorporate documents in a wide variety of common formats.

4. Semantic Categories

Semantic categories (see FIG. 3d) play multiple roles in the semantic search engine. First, they serve to organize queries to that it is possible to understand the topics that are being enquired about in a given query. Second, they allow developers to search for and navigate queries, documents and document fragments by semantic categories rather than by terms. Third, they provide contextual labels that can be used by an application to provide meaning for terms and queries; and help a user disambiguate and correctly select the desired answer in cases when the input query matches more than one canonical query or provide more than one answer. Fourth, they can be used as a much more refined way to attach external information to queries and documents. As such, instead of attaching advertisements to keywords, as is done, for instance, by Google®, AdWords® advertisements could instead be attached to semantic labels. This has numerous benefits to the user and to the advertiser: many terms may match a category; categories are not ambiguous the way that terms are; and products and services that are truly relevant a user's query can be presented. This makes contextual advertising much more satisfying for both advertisers and users.

5. Semantic Editing Scenarios

A developer uses the semantic editor in three different scenarios:

First, creation: when creating the initial set of queries, categories, answers and relations among them;

Second, editing: when correcting or modifying existing knowledge bases; and

Third, adding: when supplementing the knowledge base with a new query and its associated categories, answer and relations to other answers;

editorial "triage": when large numbers of queries are submitted together; and customization: modifying an already existing knowledge base;

The workflows for these three cases differ most significantly in that creation involves large numbers of queries, categories, answers and relations whereas editing and adding typically involve a small number of entries, perhaps only one.

Creation is the most complex task for the semantic editor:
many queries must be matched; and semantically equivalent variants merged categories for the queries must be created and organized
canonical forms for queries must be created; and
potential answers to each query must be retrieved and evaluated; and the best answers highlighted and attached to the appropriate query; the user may need to search with multiple queries to find the best answer, using a wide range of synonyms or related terms.

Creation will normally begin from a set of questions or queries (for instance, from a search analytics engine); and the authoritative document collection that provides the answers for the user's questions. Creation is done starting from the most frequent questions or queries; and working from most frequent to the least frequent. Creation is a back-office task that takes into account any knowledge about user's needs (for example, search analytics, previously constructed knowledge bases, web sites or FAQs) and knowledge of the target user base and their expected information needs. Furthermore, it is entirely feasible for a developer to read through small-to-medium-sized document collections very quickly, creating a significant number of highly relevant queries she would expect to hear asked about these documents. Some part of the initial queries may also be generated automatically from documents and other resources.

Editing and adding involve these very same tasks, but with a very small number of queries. Editing and adding can be both an interactive (on-line) or back-office task.

In any sufficiently complex knowledge base, there will inevitably be new queries that are related to other queries. The answers to these new queries may benefit from the re-use of content from already answered related queries. For instance, an answer may be constructed by re-using the entire answer of another query and then modifying it. Alternatively, an answer may be constructed from components of answers of one or more other queries. In either case, answers are constructed by looking up and retrieving answers, either in whole or as components. The semantic editor provides mechanisms for looking up, retrieving and incorporating existing answers and components of answers when creating a new answer.

Editorial triage requires an additional functionality. Considerable effort and time are expended when large numbers of questions/queries are submitted. In this case, a number of functions should be employed:

queries should be clustered and organized so that duplicates or near duplicates are identified;

matches and near matches with already existing queries are identified; and entries are clustered so that similar queries can be handled together.

In order to increase consistency, reduce gratuitous variation, and increase editorial productivity, answers to queries (as well as portions of answers) should be labeled (given unique ID's) and be available to be searched and reused when constructing new answers to questions/queries. For example, if there is an answer to topic A (say, "pregnancy and diabetes") and a new question arrives asking about Topic A and Topic B (say, "pregnancy and diabetes and diet"), the answer to the first question should be available for reuse in answering the new question. It will not be necessary to retype or reenter the answer; the developer can find the relevant answer (or answer components) and "click" on them to incorporate them "as is" into the new answer. The new answer may require additional text or editing of the reused components.

An additional use case involves customization of an already existing knowledge base. This use case, on the other hand, is probably best handled by opening the system to users and collecting novel, previously unseen queries directly from users since it already has a large set of queries, answers and categories to start with.

6. Answering Questions

Answering questions using the semantic search engine 400 can be done in multiple ways:

search:
a. the user submits a question or query 710; the semantic search engine matches 405 the user query against the queries in its knowledge base 715;
b. if one (or more) matches within an acceptable threshold, its answers and categories are retrieved 410 and the process stops 713;
c. if the query does not match within an acceptable threshold, then the query is submitted to an information retrieval engine 717.
d. if an on-line developer is available, the query results are presented to this worker in the semantic editor, the developer determines the semantic categories of the query; identifies ("maps") the best answers from among the query results (optionally performing additional searches possibly including internet searches); and inserts the query in the appropriate place in the query ontology;
e. if an on-line developer is not available, the information retrieval results are presented to the user, with an offer to have a developer send back a curated answer later via e-mail or a messaging system.

In these scenarios, the semantic search engine is adapted through human-medicated curation by creating new search engine data for each non-matching query.

7. Benefits of the Semantic Search Engine

The primary benefit of this approach is that a relatively small amount of up-front knowledge work to create the semantic search engine data for the most frequent questions is, over time, made richer and more complete based on queries submitted by users. This process ensures that the most frequent queries are incorporated early and less frequent queries are incorporated only as they are encountered. This is particularly important from a development point of view because a Zipfian distribution of queries has a very long tail of very infrequently asked queries. This statistically based approach ensures that the most valuable missing queries are added first and the less valuable missing queries are added as they are encountered. Additionally, the most common queries are generally less complex topics and more information is usually available to answer them. This means that the large mass of generally more complex, but infrequent queries in the tail of the Zipfian distribution can be answered as they arrive, in small numbers. Since many of these infrequent queries are variants of other queries, clustering by similarity considerably reduces development effort.

Over time, the number of unmatched queries shrinks so that developers will have time to refine or improve existing answers, categories and semantic relations among these data in the knowledge base. This is an important consideration, since it permits a semantic search engine to start with a relatively uncomplicated system of high-level categories and, as more and more queries arrive, to determine the best sub-categories to define and apply. It is not possible to anticipate the structure of all questions and the categories of these questions in advance during the initial creation phase.

The proposed deferred processing approach allows the developers to postpone developing and applying a complex system of categories until there is sufficient data to do this; and allows this categorization system to adjust to the type of organization that matches the information needs of users rather than an abstract, top-down theoretically useful system imposed before knowing what the user's needs are.

It is therefore possible in the proposed editorial process to start with a relatively small and underdeveloped set of queries, answers and categories; and over time develop a rich, high-evolved set.

A fundamental goal of the proposed system is to ensure that users get the best, most up-to-date, and most authoritative answers to their questions.

The tunable semantic search engine can be used as a question-answering component for topic- or domain-specific web sites (such as the NIH's MedlinePlus medical information web site), web- and telephone-based customer and technical support services; and as replacements for (or complements to) FAQs, wikis, and enterprise document collections.

The tunable semantic search system is lightweight and has a very small software, data and memory footprint. For systems with low user demand, its principal server components could be run on an inexpensive workstation-class computer, with sub-second response times for queries. The expertise to develop the semantic search engine knowledge base is also minimal: a developer must be able to understand the content of user queries and know what content in the document collection best answers a query. This is more or less the sophistication of a person asked to create a domain-specific FAQ.

Creating categories and applying them to queries requires more sophistication, but these data are not even necessary or useful for many applications, especially for small documents collections, FAQs, web sites and wikis. Categories are most valuable when the domain is complex and the range of questions and answers is very broad. They are also valuable if the application would like to link queries and categories to external information, such as products or services or advertisements that are linked to queries via categories. (such as used by such companies as Amazon®).

The system for storing and matching queries is highly flexible and inherently multilingual. This means that queries in multiple languages can be created and simply aligned with other queries and they will operate exactly as any other query. Queries, category labels and answers can be written in any language that can be represented in Unicode (effectively any language written today). For example, a medical web site such as the NIH MedlinePlus, that provides information for both English and Spanish native speakers, could develop a base semantic search knowledge base in English. The queries and categories in the knowledge base could then be translated into Spanish and all of the existing answers would be immediately tied to these queries and categories.

Figure 2C:
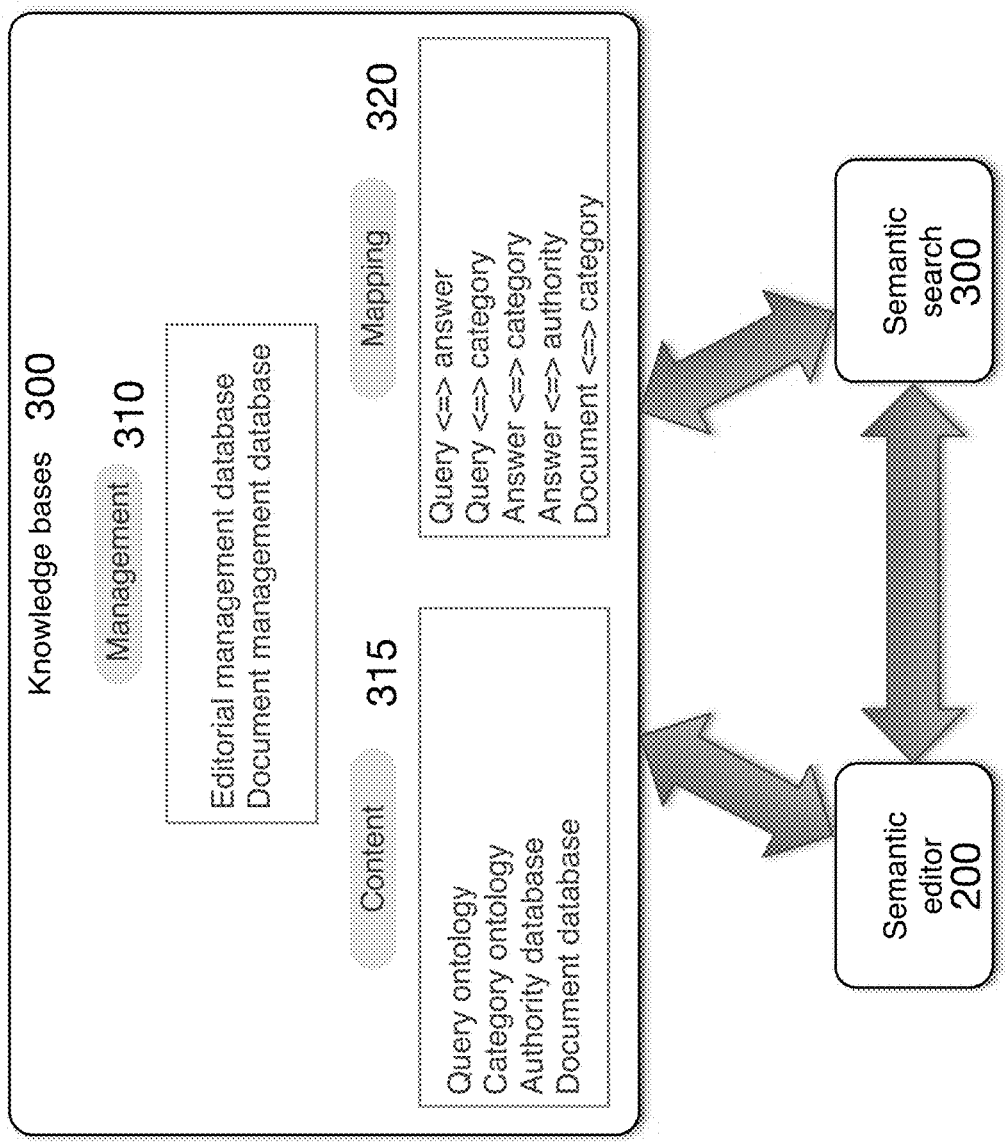
FIG. 2c shows a high level view of the knowledge bases components according to one embodiment of the present invention.

Referring now to FIG. 2c there is shown the elements of the knowledge bases 300 which includes storage for management 310, content 315 and mapping 320 functionality.

Element Management 310, includes:
editorial management database; and
document management database;
the Content element 315 includes:
query ontology;
category ontology;
document repository; and
authority (citation) database;
the Mapping 320 element includes:
query-to-answer mappings;
query-to-category-mappings;
answer-to-category-mappings; and
document-to-category mappings.

Figure 2D:
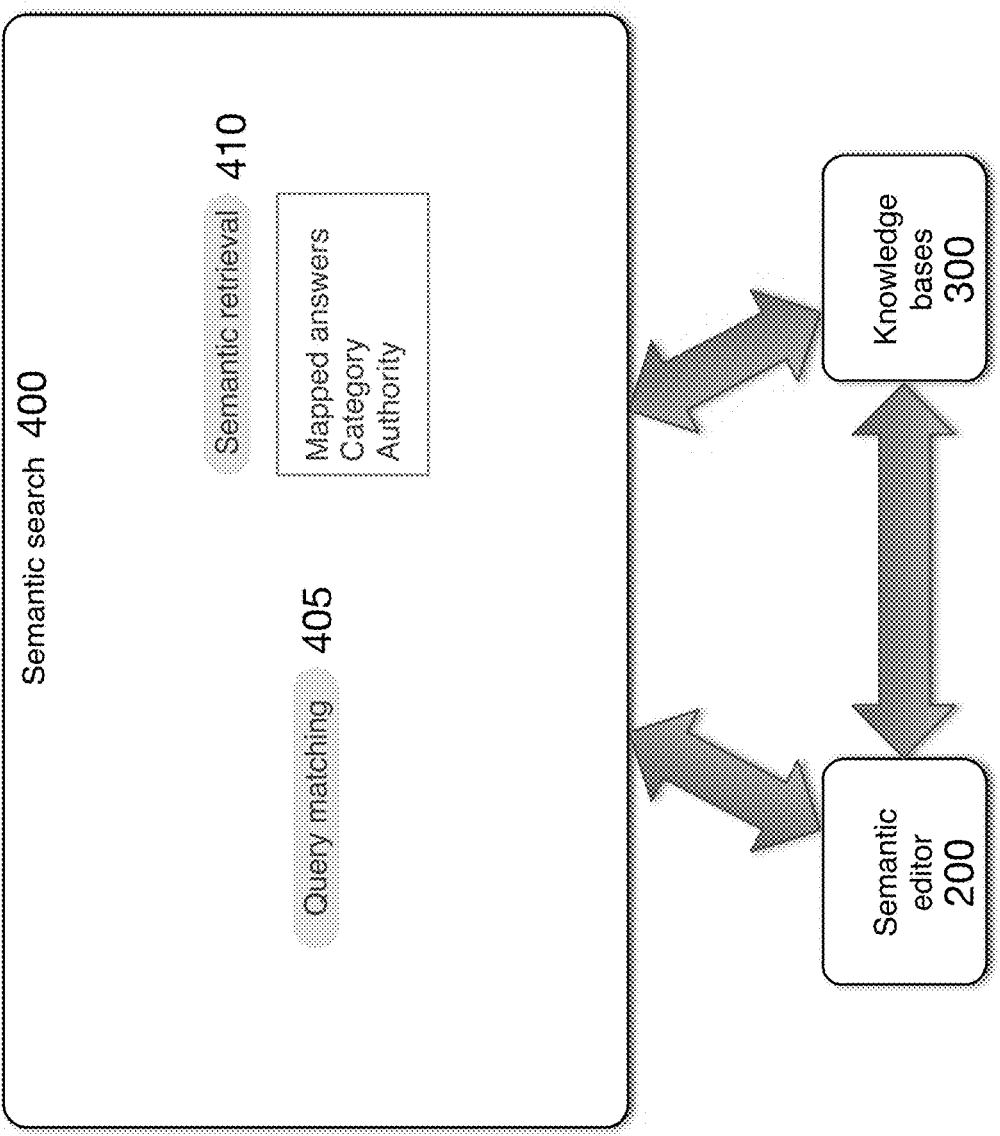
FIG. 2d shows a high level view of the semantic search components according to one embodiment of the present invention.

Referring now to FIG. 2d there is shown the elements of semantic search 400 which includes query matching 405 and semantic retrieval 410.

The Query Matching element 405 includes matching queries to find the closest matching queries given the users input;
The Semantic Retrieval element 410, includes performing semantic retrieval for retrieving and displaying semantic information associated with a given query such as:
answers;
categories; and
citations (authority).

Figure 3A:
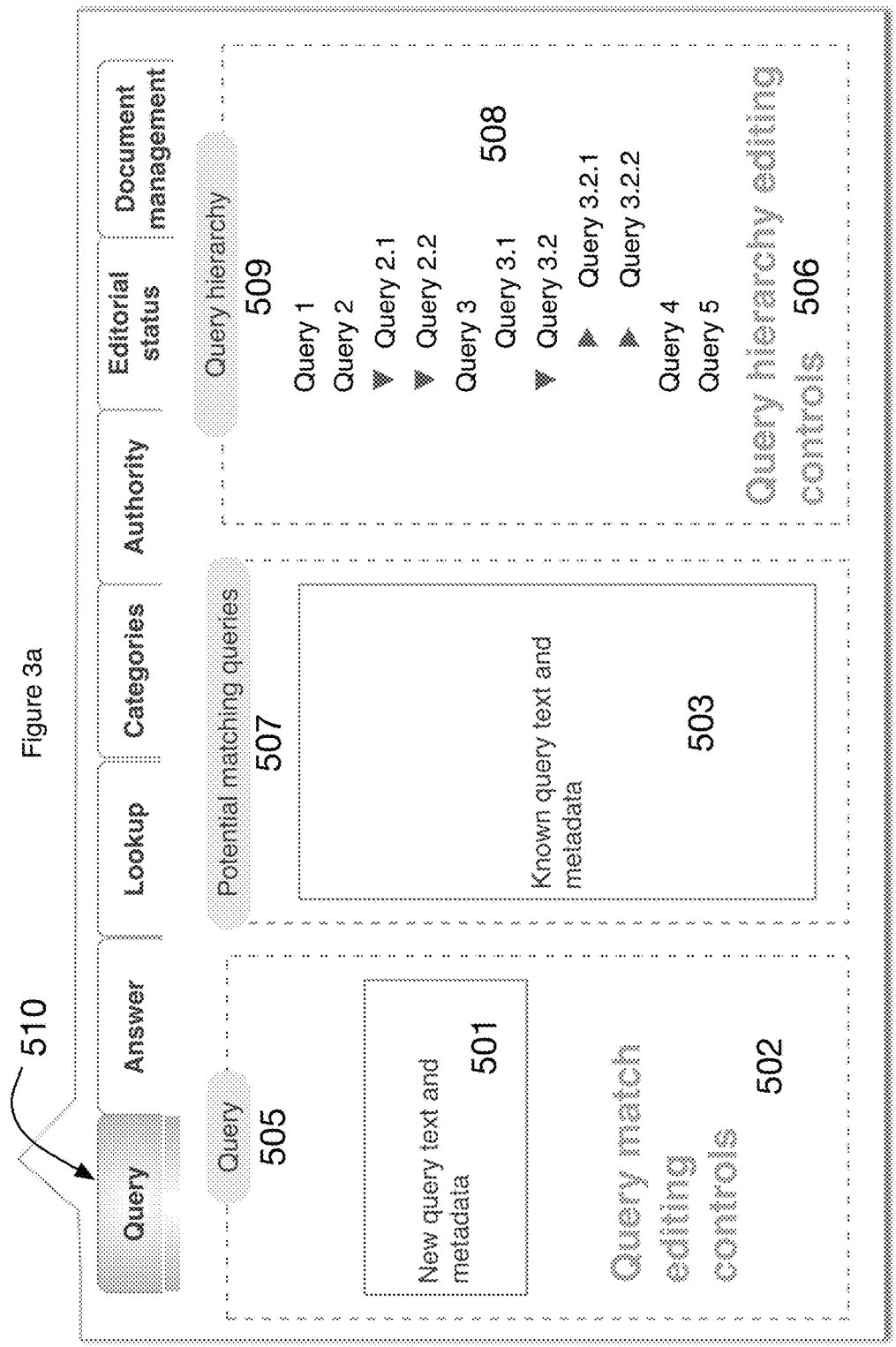
FIG. 3a shows a detailed view of the semantic editor query component according to one embodiment of the present invention.

Referring now to FIG. 3a there is shown a user interface according to one embodiment of the present invention. The Query tab 510 is a page of the interface that the developer uses to find and select existing queries; and to create new queries. Existing queries can be found by either searching for the best matches for input text and input metadata, or by browsing the hierarchy of existing queries. A query found by either means can be selected by the developer on this page.

The developer uses the Query area 505 to input text and metadata that may match existing queries of interest. The developer can also use this area to input data required to create new queries.

A New Query Text and Metadata box 501 permits the developer to input text or metadata.

A Query Matching Editing controls 502 permits the developer to modify the behavior of the search for the best matching queries; and to execute that search. These controls also permit the developer to create a query directly from data entered in the Query Text and Metadata box 501. The precise controls depend on, and are configurable to, the requirements of the specific application.

A Potential Matching Query area 507 displays the best matches for the most recent search for query.

A Known Query Text and Metadata box 503 displays the queries best matching the most recent search. Matching queries may be displayed with additional information, such as metrics for the quality of the match, or query metadata. The precise data displayed depends on, and is configurable to, the requirements of the specific application.

A Query Hierarchy area 509 provides the means to navigate existing queries by the query hierarchy, as well as the means to edit the query hierarchy.

A Query tree 508 presents the query hierarchy in a tree-like representation, and includes controls for navigating the hierarchy and changing its presentation (e.g., to expand or control nodes of the tree).

Query Hierarchy Editing controls 506 permits the developer to modify the presentation and navigation of the query hierarchy, as well as to edit the query hierarchy. The precise control depends on, and is configurable to, the requirements of the specific application.

Figure 3B:
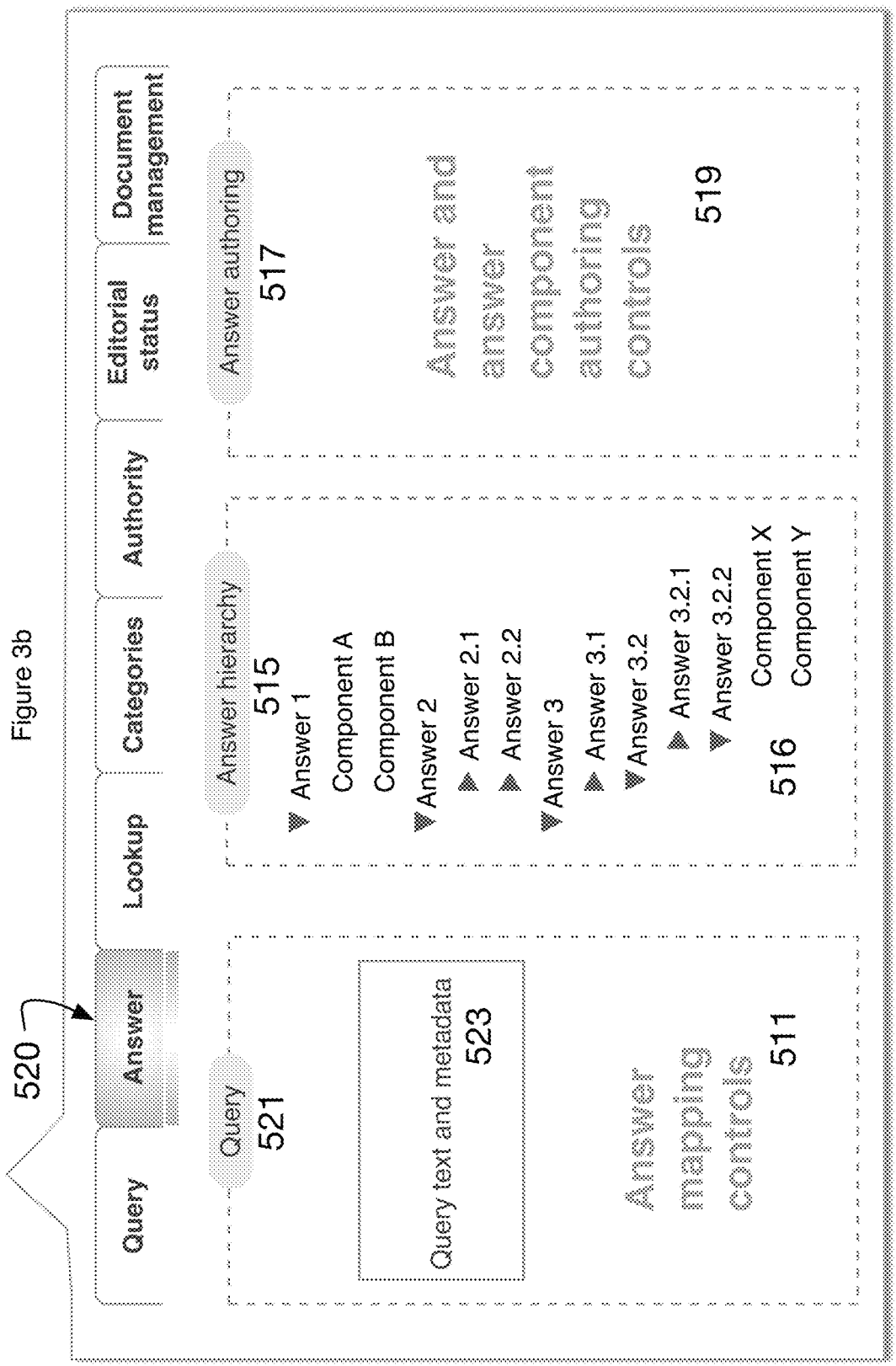
FIG. 3b shows a detailed view of the semantic editor answer component according to one embodiment of the present invention.

Referring now to FIG. 3b there is shown a user interface with an Answer tab 520 that is a page of the interface that the developer uses to find and select existing answers. It also permits the developer to edit existing answers, to edit the mappings between queries and answers, and to edit the hierarchy of answers and answer components.

A Query area 521 displays a query that was selected on the Query tab 510.

A Query Text and Metadata box 523 displays a query selected on the Query tab 510.

Answer Mapping controls 511 permits the editing of mappings between queries (selected on the Query tab 510) and answers (selected on the Answer tab 520). The precise control depends on, and is configurable to, the requirements of the specific application.

An Answer Hierarchy area 515 displays and allows for the navigation of the hierarchy of answers and answer components.

An Answer Hierarchy tree 516 presents the hierarchy of answers and answer components in a tree-like representation, and includes controls for navigating the hierarchy and changing its presentation (e.g., to expand or control nodes of the tree).

An Answer Authoring area 517 permits creation and editing of answers and answer components.

These Answer and Answer Component Authoring controls 519 permit the developer to create new answer components and to create new answers, either by writing answers and answer components directly, or by composing them from existing answers and answer components in the answer hierarchy. The precise controls depend on, and are configurable to, the requirements of the specific application.

Figure 3C:
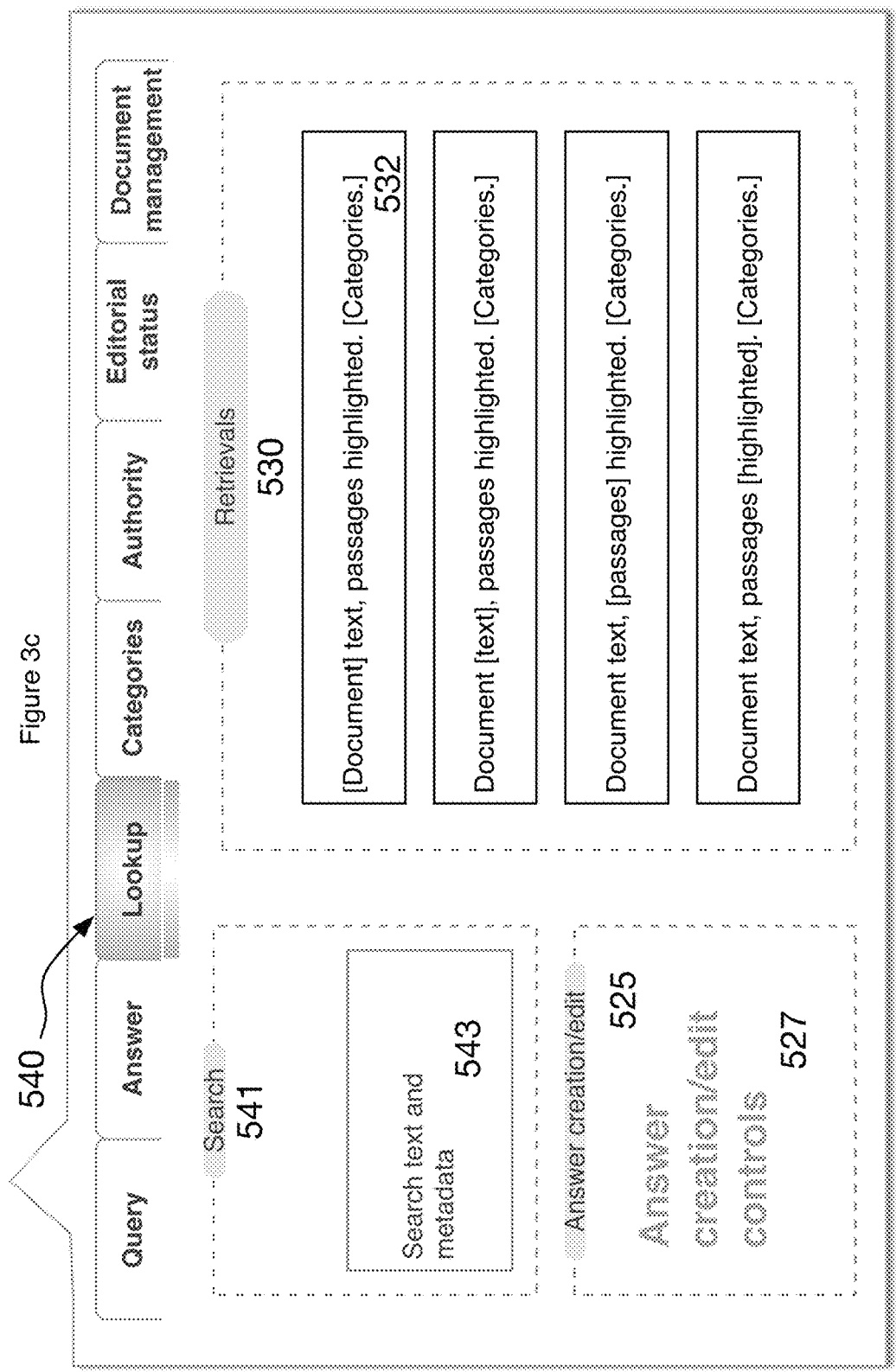
FIG. 3c shows a detailed view of the semantic editor lookup component according to one embodiment of the present invention.

Referring now to FIG. 3c there is shown a user interface with a Lookup tab 540 is a page of the interface that permits the developer to search for content that are in turn used to create answers. In the Lookup tab, the content for new answers is drawn from text in a document repository, rather than from material in the existing Answer hierarchy.

A Search area 541 permits the developer to search the document repository for material.

A Search Text and Metadata box 543 permits developers to input text or metadata, in order to search for the best matching documents in the document repository.

Answer Creation/Edit area 525 contains controls to permit the creation and editing of answers and answer components.

The Answer Creation/Edit controls 527 permits the developer to compose new answers and answer components from material in the Retrievals area 530. The precise control depends on, and is configurable to, the requirements of the specific application.

A Retrievals area 530 displays documents from the document repository that most closely match the input search.

Text and Categories boxes 532 display detailed data from individual documents in the repository that most closely match the latest search. The precise data depends on, and is configurable to, the requirements of the specific application.

Figure 3D:
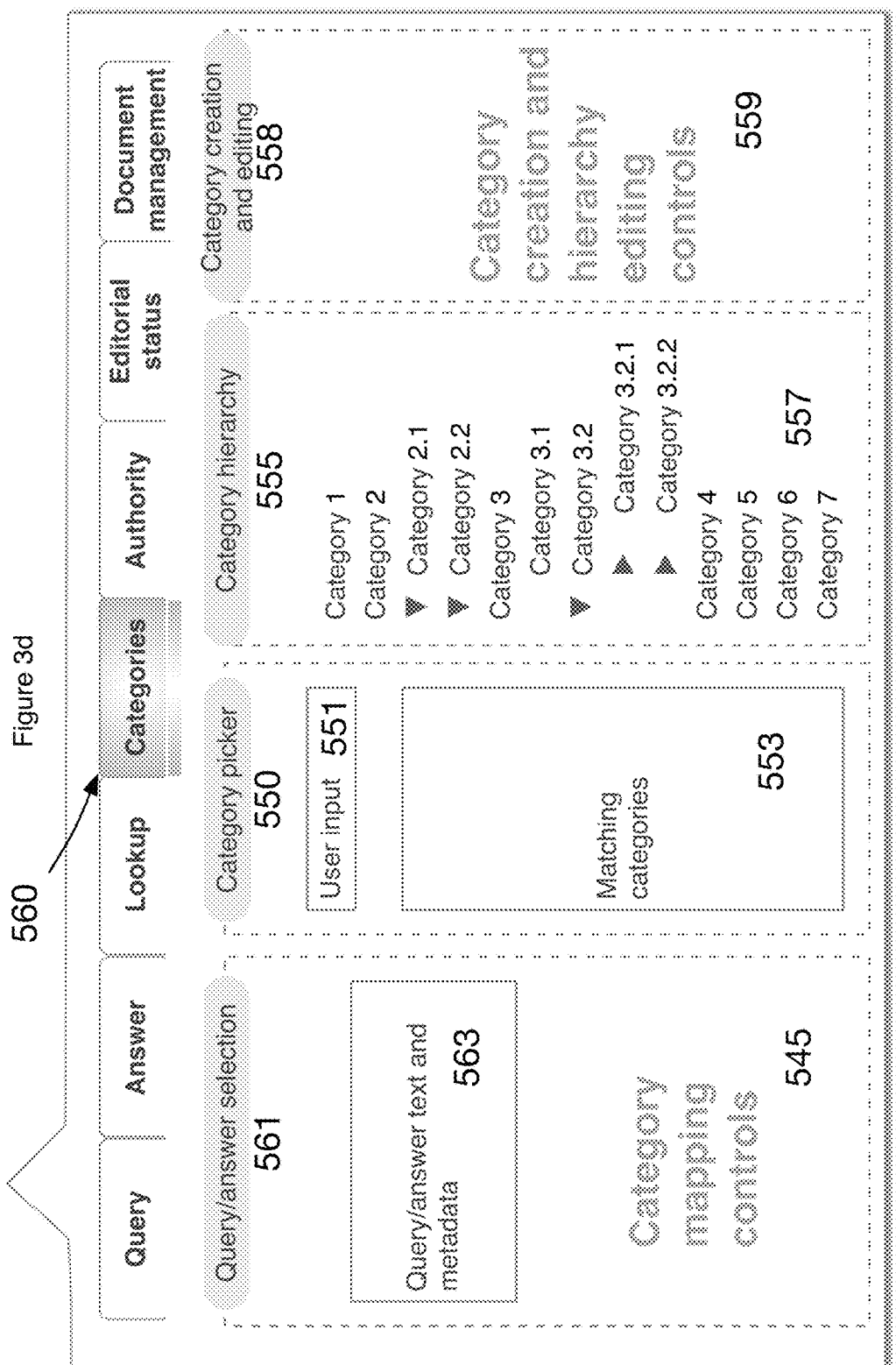
FIG. 3d shows a detailed view of the semantic editor categories component according to one embodiment of the present invention.

Referring now to FIG. 3d there is shown a user interface that includes a Categories tab 560 with a page of the interface that permits the developer to find and select categories, to assign categories to queries and answers, to create new categories, and to edit the hierarchy of categories.

A Query/Answer Selection area 561 shows a query selected on the Query tab, or an answer selected on the Answer tab 520.

A Query/Answer Text and Metadata box 563 shows the selected query or answer, along with its metadata. The precise metadata depends on, and is configurable to, the requirements of the specific application.

Category Mapping controls 545 permit the developer to add, delete, and change the mappings between categories and queries, or between categories and answers. The precise controls depends on, and is configurable to, the requirements of the specific application.

A Category Picker area 550 permits the developer to search for and select existing categories.

A User Input box 551 permits the developer to enter text, in order to find the best matching existing categories.

A Matching Categories box 553 displays the categories most closely matching the most recent search.

A Category Hierarchy area 555 permits the developer to navigate and select categories, from the hierarchy of categories.

A Category tree 557 presents the hierarchy of categories in a tree-like representation, and includes controls for navigating the hierarchy and changing its presentation (e.g., to expand or control nodes of the tree).

A Category Creation and Editing area 558 contains controls for creating and editing categories, and editing the category hierarchy.

Category Creation and Hierarchy Editing controls 559 permit the developer to create and delete new categories, and to modify the category hierarchy. The precise controls depend on, and are configurable to, the requirements of the specific application.

Figure 3E:
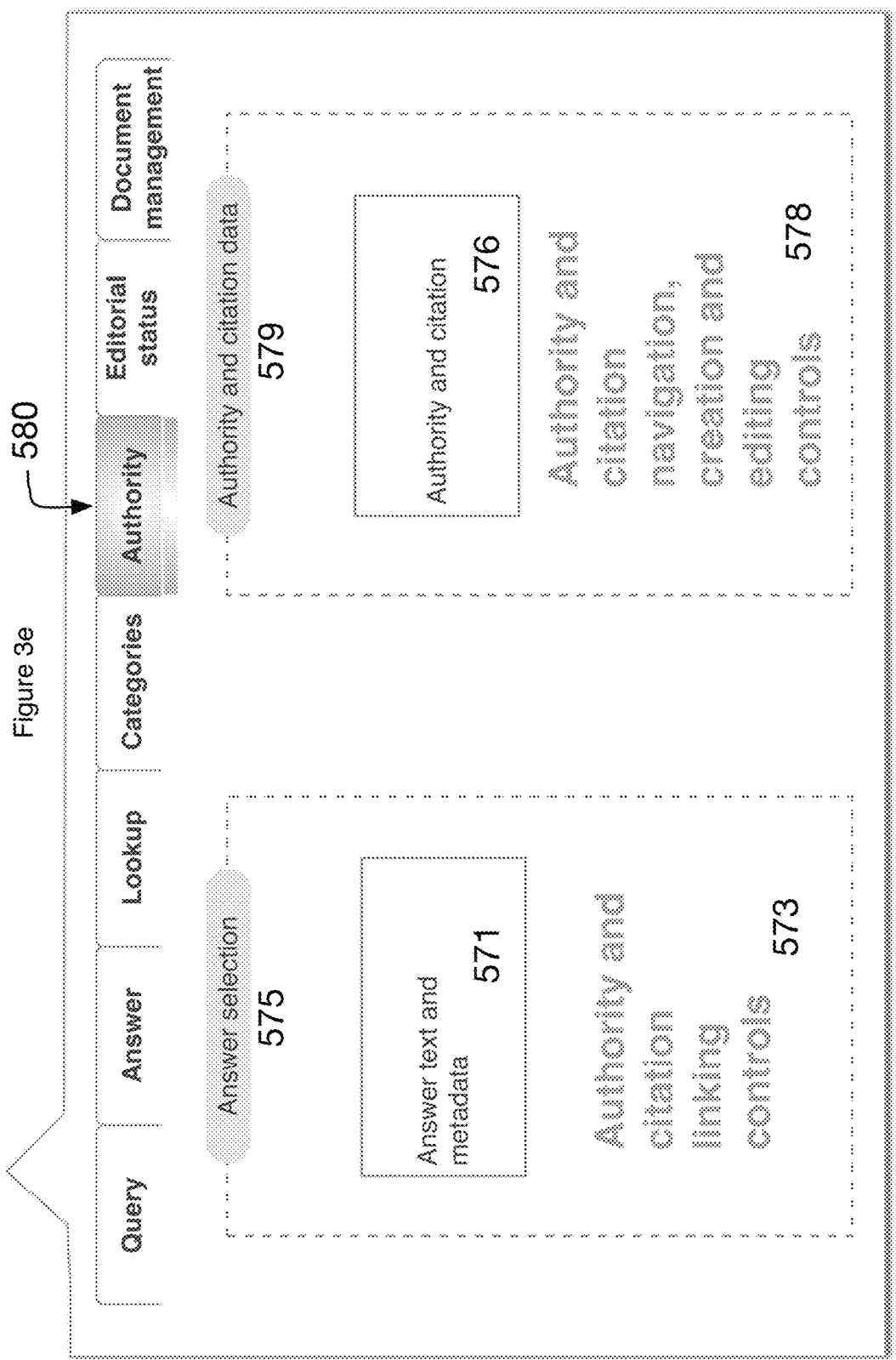
FIG. 3e shows a detailed view of the semantic editor authority component according to one embodiment of the present invention.

Referring now to FIG. 3e there is shown a user interface with an Authority tab 580 that includes a page of the interface that permits the developer to find and select authorities and citations, to create new authorities and citations, to edit and delete existing authorities and citations, and to assign authorities and citations to answers. An authority is a source for content deemed by the developer to be highly authoritative for answering the given query. A citation is a reference to a specific document or web page, from an authority, providing specific information used to answer a given query.

An Answer Selection area 575 shows an answer selected on the Answer tab 520.

An Answer Text and Metadata box 571 shows the selected answer, along with its metadata. The precise metadata depends on, and is configurable to, the requirements of the specific application.

Authority and Citation Linking controls 573 permit the developer to add, delete, and change the links between authorities and citations, on the one hand, and answers, on the other hand. The precise controls depend on, and is configurable to, the requirements of the specific application.

An Authority and Citation Data area 579 permits the developer to search for and select existing authorities and citations, or to create new ones.

An Authority and Citations box 576 displays existing authorities and citations.

Authority and Citation Navigation, Creation and Editing controls 578 permit the developer to navigate and edit existing authorities and citations, as well as creating authorities and citations. The precise controls depend on, and are configurable to, the requirements of the specific application.

Figure 3F:
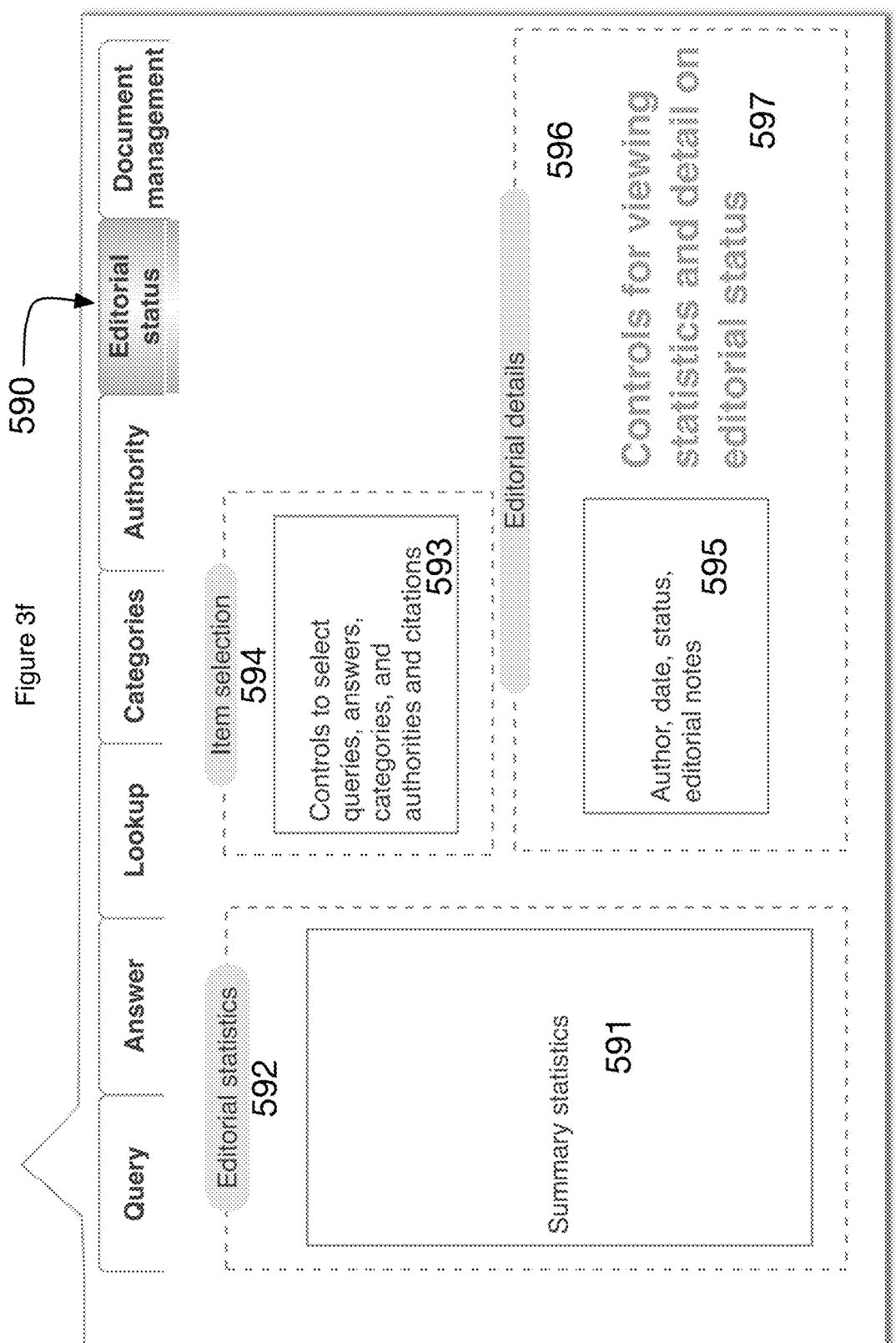
FIG. 3f shows a detailed view of the semantic editor editorial status component according to one embodiment of the present invention.

Referring now to FIG. 3*f* there is shown a user interface Editorial Status tab 590 is a page of the interface that permits the developer to view editorial statistics, and to view and assign editorial metadata to queries, answers, categories, and citations.

An Editorial statistics area 592 displays statistics.

A Summary Statistics box 591 displays summary statistics about queries, answers, categories, citations, the mappings among them, and the editing that has been performed on them.

An Item Selection area 594 displays queries, answers, categories, and citations, selected in their corresponding tabs.

A Controls to Select box 593 displays the queries, answers, categories, authorities and citations, currently selected in their corresponding tabs. It also permits the developer to identify a specific items among these potentially multiple items, for more detailed viewing and/or editing.

An Editorial Details area 596 for viewing and editing summary editorial statistics about the specific item selected in the Controls to Select box 593.

An Author, Date, Status, and Editorial Notes box 595 displays those summary statistics.

Controls for Viewing controls 597 allow the developer to navigate and display more detailed editorial metadata about the specific item selected in the Controls to Select box, such as its complete edit history. The precise controls depend on, and are configurable to, the requirements of the specific application.

Figure 3G:
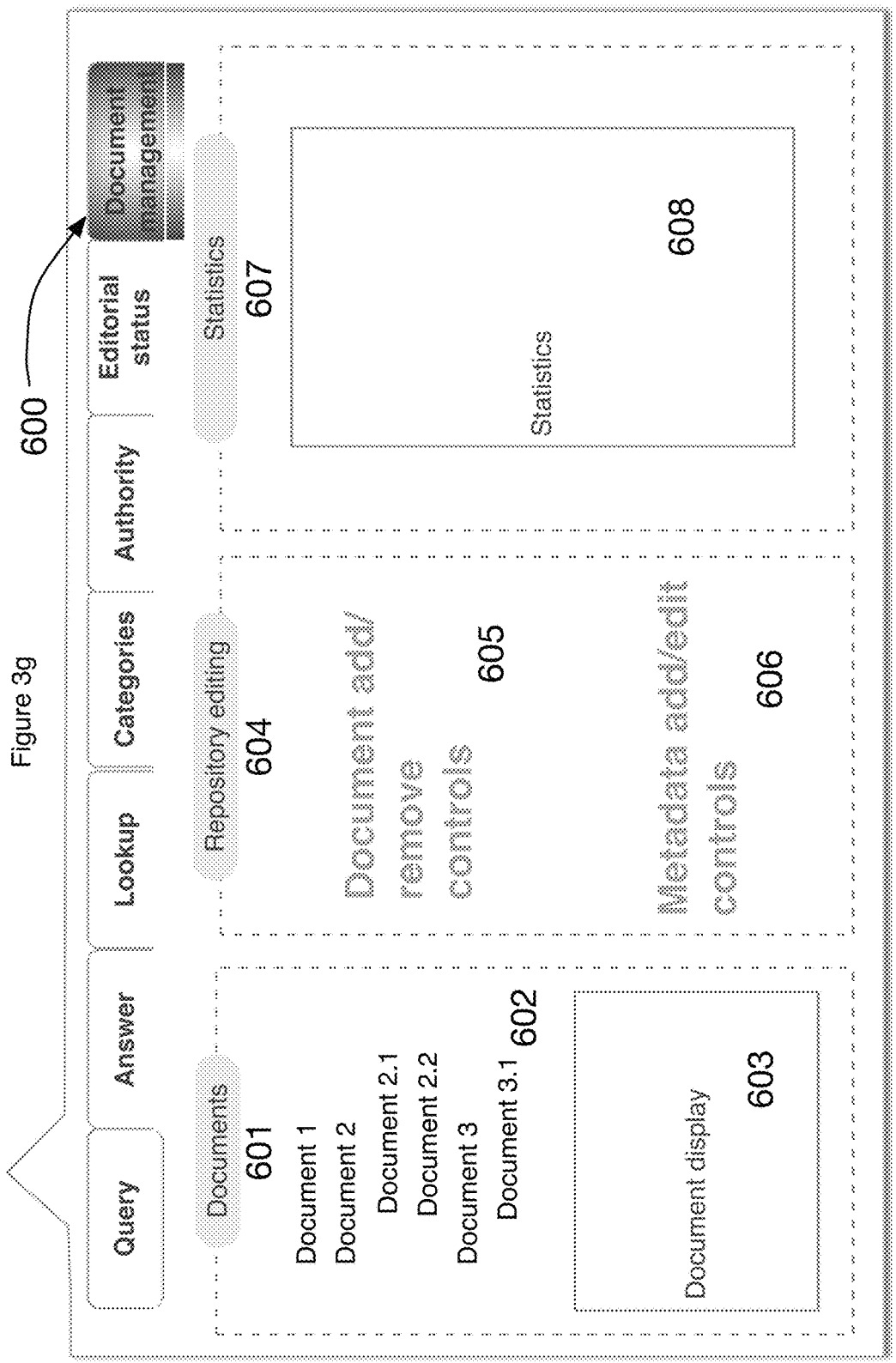
FIG. 3g shows a detailed view of the document management component according to one embodiment of the present invention.

Referring now to FIG. 3*g* there is shown a user interface which includes a Document Management tab 600 that is a page of the interface that permits the developer to select or remove documents for inclusion in the document repository; to display, add or modify document metadata associated with documents in the document repository; to display statistics about the contents of the document repository; and to display the contents of a given document in the document repository.

A Documents area 601 allows the developer to browse the document repository.

A Document tree 602 presents the content of the document repository in a tree-like representation, and includes controls for searching and navigating the repository and changing its presentation (e.g., to expand or control nodes of the tree).

A Document Display box 603 displays the content of a document selected from the Document tree.

A Repository Editing area 604 contains controls that allow the developer to modify the contents of the document repository.

Document Add/Remove controls 605 allow the developer to search for and identify individual documents or directories of documents, and to include or remove these documents from the document repository. The precise controls depend on, and are configurable to, the requirements of the specific application.

A Metadata Add/Edit control 606 allows the developer to modify the metadata associated with a given document; or add metadata to one or more documents en masse from an external data source selected by the developer. The precise controls depend on, and are configurable to, the requirements of the specific application.

A Statistics area 607 displays statistics about the document repository.

A Statistics box 608 displays statistical information 608 about the contents of the document repository (e.g., the number of documents overall or the number of documents with a given metadata attribute).

Referring now to FIG. 4 there is shown a user interface which includes a Semantic Search 610 is a page of the interface that allows users, including developers, to enter text and metadata, in order to find the most closely matching queries, the answers that have been mapped to them, and more detailed information about queries and answers.

A Query area 611 allows users to search for queries most closely matching input text.

A User Query Text box 613 is where user text is entered. Search is performed immediately, without the user having to use further controls to execute the search.

A Matching Answers area 615 displays the answers to those queries that most closely match the input text. The answers are displayed in a summary form.

An Answer box 617 is updated immediately to display the summary answers to queries most closely matching the search text, whenever that text changes. It also allows the selection of a specific summary answer.

A Detail for Selected Answer area 620 displays answer detail.

A Detail box 619 displays the canonical query, full text of the answer, authorities, citations and associated categories for the summary answer selected in the answer box.

Referring now to FIG. 5*a*, a new query submission process and reuse of existing of answer. New query is submitted 710 and a search for the query existing in the database is undergone 715. If the query exists the process stops 713. If the query does not exist a search for similar queries 717. The results of the search for similar queries are tested 719. A query is then reviewed 723 to determine whether any similar queries are appropriate for reuse to answer the input query 725. If no similar queries exist then the process flows to Answer authoring 721 in FIG. 5*b*. If the similar queries are appropriate for reuse 725. They are reused 727 and the process flow is directed to a knowledge base update 729 in FIG. 5*f*.

Referring now to FIG. 5*b* there is shown a continuation of process according to the present invention. There can be seen Answer component reuse/authoring 730, category assignment 760, authority assignment 780 and knowledge base update 790.

Referring now to FIG. 5*c* the answer and component reuse and authoring process 730 can be shown. A review of existing answer/components and their categories is conducted 732. Reusable components and categories are incorporated 734 and a determination is made whether the components are complete 736. If not, a further query search and review is conducted 738 along with further answer search and review 742, further document search and review 745 and another reusable component and categories incorporation is conducted 747. A subsequent determination regarding a complete components query is then reviewed 750. If not, the process flow then creates and incorporates new answer components 755 and then category assignment 749 undertaken.

If the first components complete review 736 is confirmed then the process flows to category assignment 749.

Referring now to FIG. 5d there is shown the category assignment process 760. A determination is made whether the categories are complete 762, and if so, the process flows to Authority assignment 780. If not, there is a search of the category database 764, appropriate categories are assigned 765 and another determination is made whether the categories are complete 766. If so, the authority assignment 780 is implemented. If not new categories are created 767 and assigned appropriately 769, then the authority assignment is implemented 780.

Referring now to FIG. 5e there is shown the authority assignment process 780. A determination is made whether the authorities are complete 781 and if so, the knowledge base update 790 is implemented. If not, there is a search of the authorities database 783, appropriate authorities are assigned 785 and another determination is made whether the authorities are complete 787. If so, the knowledge base update 790 is implemented. If not new authorities are created 788 and assigned appropriately 789, then the knowledge base update is implemented 790.

Referring now to FIG. 5f, there is shown the knowledge base update process 790. New answer components are stored 791, new categories are stored 793, new authorities are stored 795, mappings are updated 797 and authoring metadata is stored. Once completed the process ends 800.

It will be apparent to one of skill in the art that described herein is a novel apparatus, system and method for semantic editing and search engine. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A computer system for conducting semantic editing, the computer system having a readable and accessible storage medium, at least one processor and a user interface all interconnected, the computer system comprising;
a query semantic management module having computer software with instructions to perform the following steps:
finding a closest matching query to at least one stored query among a store of queries;
determining whether the at least one query is defined as at least one of the following: a substantially similar query to said at least one stored query existing in the store of queries or a novel query;
creating a set of canonical forms for the novel query;
attaching a plurality of categories to at least one of the novel query and the at least one stored query existing in said store of queries;
organizing the plurality of categories into a first set of ontologies with at least one semantic relationship between each of the plurality of categories;
organizing at least one of the novel query and the stored query existing in said store of queries into a second set of ontologies with at least one semantic relationship between the at least one of the novel query and the stored query in the store of queries;
attaching at least one answer to at least one of the novel query and the stored query in the store of queries;
a knowledge base module having computer software with instructions to perform the following steps:
storing the first and second set of ontologies, and an authority database including authorities, where, prior to storing, said authorities are curated and sourced by a developer such that the developer deems said authorities to be a source for content that is authoritative for answering said query, and where the developer periodically updates said authorities;
storing at least one mapping between at least one of the following:
a given query and an answer;
a given query and a category;
an answer and a category;
an answer and an authority as a source for content deemed to be authoritative for answering said given query; and
a document and a category;
and
a semantic search module having computer software with instructions to perform the following steps:
inputting at least one input item comprising a natural language text having at least one word;
searching the knowledge base module for matches of given queries and answers based upon a predetermined matching scale; and
reporting the matches ranked according to the predetermine matching scale.

2. The system according to claim 1, further comprising finding a matching query to the given query among the store of queries using at least one similarity algorithm.

3. The computer system according to claim 2, where the at least one similarity algorithm is a text similarity algorithm.

4. The computer system according to claim 2, where the at least one similarity algorithm is a semantic similarity algorithm.

5. The computer system according to claim 1 where said substantially similar query is defined as an equivalent query.

6. The computer system according to claim 1 where said substantially similar query is defined as a reusable query.

7. The computer system according to claim 1 where said novel query is defined and includes unrelated queries.

8. The computer system according to claim dependent claim 1 where said attaching at least one answer comprises at least one of the following steps:
creating a new answer with or without reference to at least one existing document; or reusing said at least one answer for said at least one stored query.

9. The computer system according to claim 8 where the reusing step further comprises editing the at least one answer for the least one stored query.

10. The computer system according to claim 8 further comprising the step of retrieving at least one existing mappings of the at least one stored query to selected document passages.

11. The computer system according to claim 8 further comprising the step of searching for document passages that match the given query.

12. The computer system according to claim 8 further comprising the steps of highlighting and attaching document passages to the given query.

13. The computer system according to claim 8 further comprising the step of attaching categories to documents, document sections and document passages.

14. The computer system according to claim 8 further comprising the step of supplying at least one authority to the answers of the given query.

15. The computer system according to claim 14 further comprising the step of reusing the at least one authority to answers for the given query if the at least one authority is found in the knowledge base module.

16. The computer system according to claim 14, wherein an authority is created if said authority does not exist in the knowledge base module.

17. The computer system according to claim 8 further comprising the step of supplying at least one citation as a reference to a specific document from said authority providing specific information to answers of the given query.

18. The computer system according to claim 17 further comprising the step of reusing the at least one citation to answers of the given query if the at least one citation is found in the knowledge base module.

19. The computer system according to claim 18, wherein a citation is created if said citation does not exist in the knowledge base module.

20. The computer system according to claim 1, wherein the predetermined matching scale is defined as a combination of at least one of a plurality of text and semantic similarity algorithms.

* * * * *

UNITED STATES PATENT AND TRADEMARK OFFICE
CERTIFICATE OF CORRECTION

| | |
|---|---|
| PATENT NO. | : 10,229,118 B2 |
| APPLICATION NO. | : 15/252490 |
| DATED | : March 12, 2019 |
| INVENTOR(S) | : Alwin B. Carus et al. |

It is certified that error appears in the above-identified patent and that said Letters Patent is hereby corrected as shown below:

In the Claims

At Column 20, Lines 34-35, please change "predetermine" to -- predetermined --.
At Column 20, Lines 51-52, please change "according to claim dependent claim 1" to -- according to claim 1 --.
At Column 20, Line 59, please change "for the least" to -- for the at least --.
At Column 20, Line 62, please change "mappings" to -- mapping --.

Signed and Sealed this
Sixteenth Day of April, 2019

Andrei Iancu
*Director of the United States Patent and Trademark Office*